United States Patent [19]

Lauder

[11] 4,049,583

[45] * Sept. 20, 1977

[54] METAL OXIDE CATALYTIC COMPOSITIONS HAVING PEROVSKITE CRYSTAL STRUCTURES AND CONTAINING METALS OF THE PLATINUM GROUP

[75] Inventor: Alan Lauder, Newark, Del.

[73] Assignee: E. I. Du Pont de Nemours and Company, Wilmington, Del.

[*] Notice: The portion of the term of this patent subsequent to July 29, 1992, has been disclaimed.

[21] Appl. No.: 689,385

[22] Filed: May 24, 1976

Related U.S. Application Data

[63] Continuation of Ser. No. 463,988, April 25, 1974, abandoned, which is a continuation-in-part of Ser. No. 405,052, Oct. 10, 1973, Pat. No. 3,897,367.

[51] Int. Cl.$^2$ .................. B01J 21/04; B01J 23/10; B01J 23/58; B01J 23/74
[52] U.S. Cl. ................ 252/466 PT; 252/462; 252/466 B; 252/472; 252/473; 252/474; 423/213.2; 423/213.5; 423/593; 423/594
[58] Field of Search ............ 252/462, 466 PT, 466 B, 252/472, 473, 474; 423/213.2, 213.5, 593, 594

[56] References Cited

U.S. PATENT DOCUMENTS

| | | | |
|---|---|---|---|
| 3,900,428 | 8/1975 | Mai et al. | 252/462 |
| 3,901,828 | 8/1975 | Mai et al. | 252/462 |

*Primary Examiner*—W. J. Shine

[57] ABSTRACT

Metal oxides of the type $[A^1_{1-x}A^2_x]B'_{1-y}Me_y]O_3$ having perovskite-type crystal structures in which $A^1$ and $A^2$ are each one or more mono-, di-, or trivalent metals having ionic radii between about 0.8 and 1.65 Angstroms;

$B'$ is one or more metals having ionic radii between about 0.4 and 1.4 Angstroms;

Me is one or more metals of the platinum group (ruthenium, osmium, rhodium, iridium, palladium, and platinum);

$x$ is between about 0.01 and 0.99; and $y$ is between about 0.01 and 0.20 are useful as catalysts for the oxidation of hydrocarbons and carbon monoxide and for the reduction of nitrogen oxides under conditions typical of those involved in the cleanup of the exhaust gases of internal combustion engines.

12 Claims, 2 Drawing Figures

METAL OXIDE CATALYTIC COMPOSITIONS HAVING PEROVSKITE CRYSTAL STRUCTURES AND CONTAINING METALS OF THE PLATINUM GROUP

RELATED APPLICATION

This application is a continuation of application Ser. No. 463,988, now abandoned but filed Apr. 25, 1974, as a continuation-in-part of application Ser. No. 405,052, filed Oct. 10, 1973, now U.S. Pat. No. 3,897,367, issued July 29, 1975.

BACKGROUND OF THE INVENTION

1. Field of the Invention

This invention relates to novel metal oxides having perovskite-type crystal structures and containing metals of the platinum group. These oxides are catalytically active, especially in heterogeneous gas-phase reactions like those involved in the oxidation-reduction purification of the exhaust gases from internal combustion engines.

2. The Prior Art

Much effort has been expended in recent years in developing improved heterogeneous catalysts for the oxidation of volatile carbon compounds in air and for the reduction of nitrogen oxides to nitrogen by hydrogen, carbon monoxide, and other carbon compounds. Such efforts have been directed toward the reduction of atmospheric pollution by industrial processes but have also been largely directed toward the reduction of atmospheric pollution by exhaust gases from internal combustion engines. Catalysts useful in such processes will desirably be low in cost, selective in promoting desired oxidation and/or reduction reactions at relatively low temperatures, active for long periods at the temperatures involved and in the presence of the materials incidental to these reactions, simple to prepare in suitable forms having high catalytic activity, active at relatively low surface areas per unit weight of catalytic material, and will also desirably have other properties well recognized in the art.

Among the catalytic materials proposed for use in promoting chemical reactions such as those involved in the purification of automotive exhaust gases are catalysts containing the platinum metals ruthennium, osmium, rhodium, iridium, palladium, and platinum. Such catalytic materials are relatively expensive; require sometimes impractically large amounts of scarce materials; frequently must be prepared by carefully controlled processes for optimum catalytic activity; are relatively short-lived, apparently because of either the formation of relatively volatile oxides (osmium and ruthenium), because of changes in crystallite particle size or surface properties, or because of interaction with various components of exhaust gases in ways which reduce their catalytic activity (for instance by forming catalytically less active compounds or alloys and by forming volatile halide compounds); and are unsatisfactory in other ways.

SUMMARY OF THE INVENTION

The present invention comprises compounds having cations of metals in sites of Type A and of Type B with oxygen ions in the proportions $ABO_3$ and having the perovskite crystal structure wherein the sites of Type A are occupied by cations of at least two different metals having ionic radii between 0.8 and 1.65A, each being present in at least 1% of said Type A sites; from about 1% to 20% of the Type B sites are occupied by ions of the platinum metals; and the remaining Type B sites are occupied by ions of nonplatinum metals having ionic radii between 0.4 and 1.4A.

Such metal oxide compounds are useful as catalysts for the oxidation of carbon monoxide and gaseous hydrocarbons and for the reduction of nitrogen oxides under conditions typical of those involved in the cleanup of the exhaust gases from internal combustion engines. They are particularly attractive catalysts for the purification of automotive exhaust gases because of their relatively low cost, stability in such exhaust gases under oxidizing and reducing conditions at high temperatures, simplicity in preparation in suitable forms having high catalytic activity (even when having relatively low surface areas and when containing relatively small amounts of expensive metals), and because they catalyze relatively complete conversion of the obnoxious components of automotive exhaust gases to innocuous substances.

The compounds of this invention require the presence of platinum group metals (ruthenium, osmium, iridium, rhodium, palladium and platinum) occupying from 1% to 20% of the Type B sites. The remaining B sites, which will be called B' sites, are occupied by other, more readily available metals, which can be divided into two broad classes, (1) metal ions which can exist in the perovskite structure in more than one valence and which preferably contribute to the utility of the compounds as catalysts (most preferably such metals are present in more than one valence state) and (2) metal ions present in a single fixed valence state (such as aluminum) which contribute mainly to the stability of the compounds. The compositions necessarily have at least 50% of the B sites occupied by members of only one of the above classes. Preferably 75% and most preferably all of the B' sites are occupied by ions of one of the aforesaid classes. The metal ions occupying B' sites are from groups 1A, 1b, 2A, 2B, 3B, 4A, 4B, 5A, 5B, 6B, 7B or 8 or from the lanthanide or actinide rare earth metals and normally have valences one to seven (usually one to five). The preferred B' metals having valence one are from groups 1A and 1B, those having valence two are from groups 1B, 2A, 2B, 3B 6B, 7B, and 8; those having valence three are from groups 3A, 3B, 4B, 5B, 6B, 7B and 8 and the lanthanide and actinide rare earth metals; those having valence four are from groups 4A, 4B, 5B, 6B, and 7B or from the transition elements of the first period; and those having valence five are from groups 5A, 5B, 6B, and 7B.

One preferred class of B' metal ions are of transition metals of atomic number 22 to 29 inclusive which can exist in more than one valence and wherein part of the B' metal is in one valence and another part is in a second valence. Particularly preferred are iron, nickel and cobalt which are preferably in the trivalent state with from 5% to 50% of at least one species in the tetravalent state.

A preferred class of ions having fixed valence which occupy B' sites are ions of the metals of Group IIIA of the Periodic Table of which aluminum is most preferred.

Each of the metals of Type A is present in at least 1% of the total atomic amount of all the metals of Type A. The Type A metals are from groups 1A, 1B, 2A, 2B, 3B, 4A and 5A from the lanthanide rare earth metals, or from the actinide rare earth metals. The Type A metals will normally have valences from one to three. Preferably the Type A metals having valence one are from groups 1A and 1B; the type A metals having valence two are from groups 2A, 2B, 4A, and the lanthanide rare earth metals which form oxides of the type RE-(II)0; and the Type A metals having valence three are from group 3B or from the lanthanide rare earth metals. Most preferably at least two of the Type A metal ions differ in valence.

A preferred class of compounds having variable valence metal ions occupying B' sites and having the perovskite structure have from about 1% to up to 20% of the B cation sites occupied by ruthenium or platinum ions and the remainder of the B cation sites occupied by ions consisting essentially of cobalt ions, and the A cation sites are occupied by lanthanide ions of atomic number 57 to 71 and ions of at least one metal of groups 1A, 2A, and 4A of the periodic table having ionic radii of about 0.9 Angstroms to 1.65 Angstroms and proportioned so that no more than 50% of the cobalt ions are tetravalent and the remaining cobalt ions are trivalent. Particularly preferred are compositions having the formula $$[Sr_xLa_{1-x}][Co_{1-y}Ru_y]O_3$$

wherein $y$ is from 0.01 to 0.2 and $(1-x)$ is $0.95(1-y)$ to $0.5(1-y)$ and compositions having the formula $$[Sr_xLa_{1-x}][Co_{1-y}Pt_y]O_3$$

wherein $y$ is from 0.01 to 0.1 and $(1-x)$ is $0.95(1-y)$ to $0.5(1-y)$.

In other aspects this invention comprises any of the above compounds on a shaped support and affixed to such a support with a binder. The preferred embodiment of the support is alumina shaped in the form of a honeycomb.

THE DRAWINGS

DETAILED DESCRIPTION OF THE INVENTION

Figure 1:
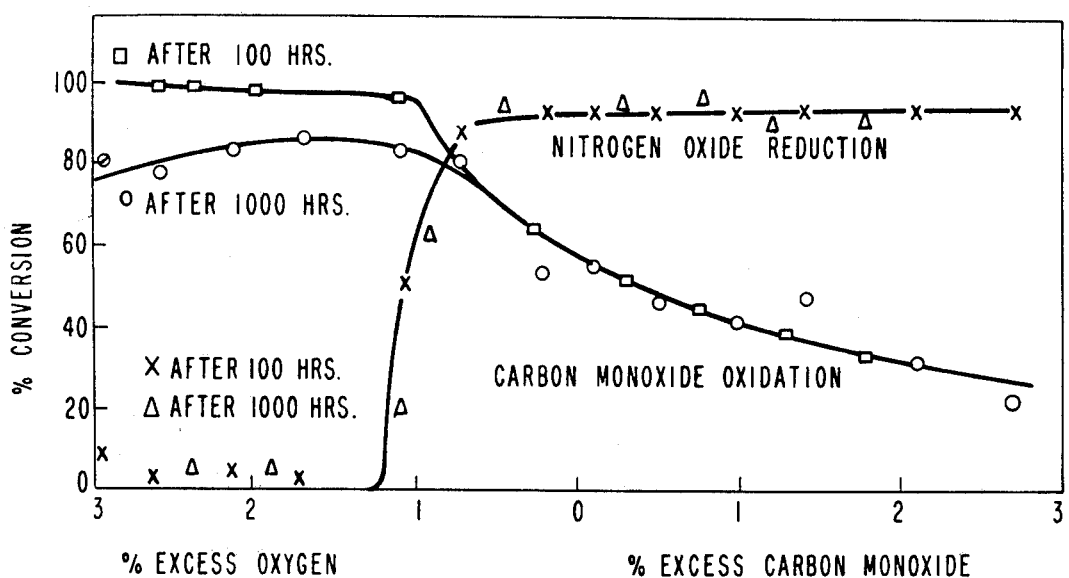
FIG. 1 shows the percentage conversion obtained in the ctalytic reduction of nitrogen oxides ($NO_x$) and in the oxidation of carbon monoxide as a function of excess carbon monoxide and of excess oxygen in an internal combustion exhaust gas treated with the catalyst of Example 2.

The metal oxide compounds of this invention are oxides of the general empirical formula $ABO_3$ (equivalent to $A_2B_2O_6$, $A_3B_3O_9$, etc.) containing substantially equal numbers of cations of two different types of metals, called herein metals of Type A and metals of Type B, and at least two different metals of each of the two types. Thus they can be considered oxides of the formula $[A^1A^2 ... A^i][B^1B^2 ... B^j]O_3$ in which the total number of ions, $A^1, A^2, ... A^i$, is substantially equal to the total number of ions, $B^1, B^2, ... B^j$, and in which there are at least two different metals $B^1$ and $B^2$ of Type B. In the ideal perovskite structure such oxides contain cations of appropriate relative sizes and coordination properties and have cubic crystalline forms in which the corners of the unit cubes are occupied by the larger Type A cations (each coordinated with twelve oxygen atoms), the centers of the cubes are occupied by the smaller Type B cations (each coordinated with six oxygen atoms), and the faces of the cubes are occupied by oxygen atoms. Variations and distortions of this fundamental cubic crystal structure are known among materials commonly considered to be perovskites or perovskite-like Distortions of the cubic crystal structure of perovskite and perovskite-like metal oxides include rhombohedral, orthorhombic, pseudocubic, tetragonal, and pseudotetragonal modifications.

As indicated, the compounds of this invention contain at least two metals of Type A and at least two metals of Type B. At least one of the metals of Type B is a metal of the platinum group (elements of the second and third long periods in group 8 in the PERIODIC TABLE) and at least one of the metals of Type B is a B' metal (not of the platinum group). Therefore the compounds of this invention include metal oxides of the type $$[A^1_{1-x}A^2_x][B'_{1-y}Me_y]O_3$$

having perovskite crystal structures in which $A^1$ and $A^2$ are each one or more mono-, di-, or trivalent metals having ionic radii between about 0.8 and 1.65 Angstroms;

B' is one or more non-platinum group metals having ionic radii between about 0.4 and 1.4 Angstroms;

Me is one or more of the platinum metals ruthenium, osmium, rhodium, iridium, palladium, and platinum;

$x$ is between about 0.05 and 0.95; and $y$ is between about 0.01 and 0.20.

The particular Type A metals present in the metal oxide compounds of this invention are leass critical then the Type B metals, an important property of the Type A metals being the radii of their cations. The importance of ionic radii in perovskite crystal structures has been discussed by many authors, e.g., by Krebs in "Fundamentals of Inorganic Crystal Chemistry," McGraw Hill, London (1968). Assuming that the crystal structure is formed by the packing of spherical ions, there can be derived the relationship $$R_A + R_O = t\sqrt{2}(R_B + R_O)$$

in which $R_A$, $R_B$, and $R_O$ are the ionic radii of the Type A metal, the Type B metal, and the oxygen ions respectively and $t$ is a tolerance factor. Tetragonal perovskite crystal structures are usually obtained in simple ternary compounds when $t$ is between about 0.9 and 1.0. Distorted perovskite-type structures usually result when $t$ is between about 0.8 and 0.9. Perovskite-type structures can be obtained with wider departures from this idealized picture in the more complex compounds of the present invention, particularly when these compounds contain small proportions of ions having radii larger or smaller than would be accommodated with the tolerance factor $t$ between 0.8 and 1.0. Ionic radii have been tabulated by Shannon and Prewitt Acta. Cryst. B26 1046 (1970); B25 925 (1969).

The metals of Type A can be from the periodic table groups 1A, 1B, 2A, 2B, 3B, 4A, from the lanthanide rare earth metals (atomic number 58 through 71) and from the actinide rare earth metals (atomic number 90 through 104).

The metals of Type A in these compounds which have valence one are metals from groups 1A and 1B. Preferably they are cesium, rubidium, potassium, sodium, or silver and more preferably they are potassium or sodium.

Similarly the Type A metals having valence two are from groups 2A, 2B, 4A, and the lanthanide rare earth metals which form oxides of the type RE(II)O. Preferably they are barium, strontium, calcium, or lead and more preferably they are strontium or barium.

Likewise the Type A metals having valence three are from group 3B, 5A and the lanthanide and actinide rare earth metals. Preferably they are lenthanum or a mixture of the lanthanide rare earth metals (e.g., a mixture containing about one-half cerium, one-third lanthanum, one-sixth neodymium, and smaller amounts of the remaining metals of atomic number 58 through 71 or a similar mixture from which a major part of the cerium has been removed), which mixture is designated herein by the symbol RE.

The B' metals which constitute about 80% to 99% of the metals of Type B in the invention compounds are from groups 1A, 1B, 2A, 2B, 3A, 3B, 4A, 4B, 5A, 5B, 6B, 7B, and 8 or from the lanthanide or actinide rare earth metals.

The B' metals having valence one are from groups 1A and 1B. Preferably they are sodium, silver, or copper.

The B' metals having valence two are from groups 1B, 2A, 2B, 3B, 6B, 7B, and 8. Preferably they are magnesium, calcium, strontium, chromium, manganese, iron, cobalt, nickel, or copper.

The B' metals having valence three are from groups 3A, 3B, 4B, 5B, 6B, 7B, and 8 and the lanthanide and actinide rare earth metals. Preferably they are lanthanum, a lanthanide rare earth metal, aluminum, chromium, manganese, iron, cobalt, or nickel.

The B' metals having valence four are from groups 4A, 4B, 5B, 6B, 7B and 8. Preferably they are titanium, tin, vanadium, chromium, molybdenum, manganese, iron, cobalt, nickel, or rhenium.

The B' metals having valence five are from groups 5A, 5B, and 7B. Preferably they are antimony, niobium, tantalum, vanadium, or rhenium.

The B' metals having valence six and seven are preferably tungsten, molybdenum, or rhenium.

Between about 1% and about 20% of the cations of metals of Type B in the invention compounds are the ions of platinum metals. Ruthenium, osmium, rhodium, and iridium are capable of occupying all of the Type B cation sites in perovskite crystal structures, but little additional benefit is achieved when more than about 20% of the sites are occupied by these metals. Palladium and platinum ions are larger than ruthenium, osmium, rhodium, and iridium ions and generally not more than about 10% of the Type B sites of crystalline oxides of the $ABO_3$ type can be occupied by the ions of these metals with retention of a perovskite structure. Palladium is typically divalent; rhodium is typically trivalent; ruthenium, iridium, and platinum are typically tetravalent; and osmium can have a valence of four, five, six, or seven in these compounds. Mixtures of the platinum metals obtained by the partial refining of their ores are useful in these compounds.

The metal oxides of this invention containing ruthenium are particularly useful as catalysts for the reduction of nitrogen oxides. They generally catalyze the reduction of these oxides to innocuous compounds (e.g., nitrogen) instead of to ammonia. Such oxides containing ruthenium are, in general, more stable than similar compounds containing osmium, possibly because of the lower volatility of ruthenium oxides, and are also preferred because of the generally greater toxicity of osmium compounds. Metal oxides containing platinum and palladium are particularly useful as catalysts for the complete oxidation of carbon compounds to carbon dioxide.

The metals of Type A and of Type B indicated to be preferred in the various valences one to seven are preferred because of one or more of the following reasons:
1. their ionic size, with correspondingly increased ease of formation and greater stability of perovskite crystal structures;
2. their capability of existing in perovskite crystal structures in which they are in more than one valence;
3. their generally high catalytic activity and/or selectivity in metal oxide compounds; or
4. their greater abundance and corresponding generally lower cost.
5. their stability in perovskite structures.

Certain compounds of this invention contain B' metals having a single fixed valence. Such compounds have a major proportion (e.g., at least 50% and preferably 75% or more) of B' sites occupied by metal ions which are known in perovskite crystal structures primarily or only in one valence in addition to the ions of the platinum metal. The B' metal ions of this group are:
valence 1: lithium, sodium, silver;
valence 2: magnesium, calcium, strontium, barium, zinc, cadmium;
valence 3: aluminum, gallium, indium, thallium, lanthanum, yttrium and neodymium;
valence 4: zirconium, hafnium, thorium, germanium, tin;
valence 5: antimony, tantalum;
valence 6: tungsten.

Preferably the B' metals of this class are sodium, magnesium, calcium, strontium, aluminum, tin or antimony. These relatively abundant metals can be present in the compounds of this embodiment in major proportions with relatively small reductions in the catalytic activity contributed to these compounds by other less readily available metals and therefore represent relatively inexpensive diluents in such compounds. More preferably, the compounds contain aluminum as the major B' metal. Aluminum is not only an inexpensive diluent but also imparts to perovskite crystal structures a high degree of thermal stability and durability in catalytic applications.

Another class of compounds contain a major proportion (e.g., at least 50% and preferably more than 75%) of B' sites occupied by metal ions which are known in a first valence in one perovskite compound and in a second valence in a second perovskite compound. Such B' metals known in perovskite crystal structures in two valences differing in increments of one or two valence units are
valences 1 and 2: copper;
valences 2 and 3: scandium, samarium, ytterbium;
valences 2 and 4: lead;
valences 2, 3, and 4: chromium, manganese, iron, cobalt, nickel, and cerium;
valences 3 and 4: titanium, praseodymium;
valences 3, 4, and 5: vanadium;
valences 3 and 5: bismuth niobium
valences 4 and 6: molybdenum;
valences 4, 5, and 6: rhenium and uranium.

The compounds of this class contain one and preferably two or more such variable-valence B' metals, particularly those nonplatinum metal transition metals which have atomic numbers between 22 and 29 inclusive (titanium, vanadium, chromium, manganese, iron, cobalt, nickel and copper. Most preferred are iron, cobalt and nickel. These metals are relatively available and compounds containing them are more generally active catalysts, possibly because these metals are capable of existing in perovskite crystal structures in two or three valences differing by one valence unit increments.

In particular, the compounds of this class wherein the variable valence B' element is present in two valences constitute an important aspect of this invention. Such metal oxides have increased activity as catalysts over similar compounds in which each of the component metals is present in only a single valence, possibly because of the enhanced electron mobility through their crystal structures resulting from the presence of a variable-valence metal, when the B' sites are occupied by at about 5% of a variable-valence metal in a first valence and at least 5% of the B' site and occupied by the same metal in a second valence. The valences will usually differ by one unit but will differ by two units with some metals (e.g., lead and niobium).

The proportion of the two valences of an variable-valence metal can be determined by the other metals in the perovskite, their valences, their relative amounts, and their total amount relative to the amount of oxygen in the compound as described herein below. Thus the composition $$[Ca_{0.2}La_{0.8}][Co_{0.9}Ru_{0.1}]O_3$$

can be formulated $$[Ca(II)_{0.2}La(III)_{0.8}][Co(III)_{0.8}Co(IV)_{0.1}Ru(IV)_{0.1}]O_3$$

with cobalt present in valences three and four so that the total valence charge of the metals equals the total valence charge of the oxygen atoms. Other examples include $$[Sr(II)_{0.2}RE(III)_{0.8}][Co(III)_{0.8}Co(IV)_{0.1}Ru(IV)_{0.1}]O_3$$
$$[Sr(II)_{0.2}La(III)_{0.8}][Co(III)_{0.8}Co(IV)_{0.1}Pt(IV)_{0.1}]O_3$$
$$[K(I)_{0.2}Sr(II)_{0.2}La(III)_{0.6}][Co(III)_{0.4}Co(IV)_{0.4}Ru(IV)_{0.2}]O_3$$
$$[Ba(II)_{0.5}La(III)_{0.5}][Li(I)_{0.1}Mn(III)_{0.4}Mn(IV)_{0.4}Os(VI)_{0.1}]O_3$$

In those compositions which contain two or more metals which may be present in two valences (e.g., manganese and osmium the last composition above), the assignment of the relative amounts of each metal to a given valence class can be made in accordance with the discussions hereinabove of the metals which are capable of existing in perovskite and perovskite-like crystal structures in more than one valence and of the importance of ionic radii in the formation and distortion of perovskite structures.

Among the particularly preferred compounds within this subgroup are compounds having the formula $$[Sr_xLa_{1-x}][Co_{1-y}Me_y]O_3$$

wherein Me is platinum or ruthenium, $y$ is about 0.01 to 0.2, when Me is ruthenium and about 0.01 to 0.1 when Me is platinum, and $x$ is selected to give 5% to 50% of the cobalt ions in the tetravalent state. From the requirement of electrical neutrality it follows that $$(1-x) = (1-y)(1-f)$$

when $f$ is the fraction of the cobalt ions in the tetravalent state, so that with the above limitations $$(1-x) = 0.95(1-y) \text{ to } 0.5(1-y)$$

In the above, the stoichiometric requisite of metals and oxygen are met. However, this invention should be understood to include compounds containing defect structures with an excess or a deficiency of metal ions of up to 25 atomic percent of the requisite for the ideal $ABO_3$ perovskite crystal structure.

Compounds in which metals are in particular valences may, however, form at lower temperatures, be more active catalysts, or be more stable as catalysts in some processes. For example, there are indications that perovskites containing the transition metals titanium through copper form at lower temperatures with a larger fraction of titanium in valence four than in valence three, with more nearly equal fractions of chromium, manganese, iron, and cobalt in valences four and three, with a larger fraction of nickel in valence three than in valence two, and with a larger fraction of copper in valence than two in valence one. Vanadium is commonly found in perovskites in valence five.

Other compounds within the scope of this invention include $$[Cs_{0.3}Sr_{0.3}Nd_{0.4}][Cu_{0.1}Ti_{0.8}Os_{0.1}]O_3$$
$$[K_{0.025}Re(II)_{0.05}RE(III)_{0.925}][Ni_{0.9}Pt_{0.1}]O_3$$

$$[Cs_{0.2}Ba_{0.2}La_{0.6}][Cu_{0.2}Ti_{0.6}Ru_{0.2}]O_3$$

$$[Rb_{0.05}Sr_{0.10}La_{0.85}][Fe_{0.8}Ru_{0.2}]O_3$$

$$[K_{0.05}Ba_{0.2}Re(III)_{0.75}][Co_{0.8}Ru_{0.1}Nb_{0.1}]O_3$$

$$[K_{0.1}Ca_{0.2}Re(III)_{0.7}][Co_{0.3}Mn_{0.4}Nb_{0.2}Os_{0.1}]O_3$$

$$[K_{0.1}Sr_{0.2}Re(III)_{0.7}][Pt_{0.05}Ti_{0.7}V_{0.25}]O_3$$

$$[Rb_{0.4}Cs_{0.6}][Pt_{0.1}Nb_{0.8}W_{0.1}]O_3$$

$$[Rb_{0.9}Ba_{0.1}][Pt_{0.1}Mo_{0.9}]O_3$$

$$[K_{0.8}Ba_{0.2}][Ru_{0.2}V_{0.8}]O_3$$

$$[Rb_{0.7}Pb_{0.3}][Ce_{0.2}Mo_{0.7}Pt_{0.1}]O_3$$

$$[K_{0.95}Sr_{0.05}][Pd_{0.05}Nb_{0.95}]O_3$$

$$[K_{0.25}Sr_{0.75}][Ti_{0.65}Mo_{0.25}Ru_{0.1}]O_3$$

$$[Cs_{0.2}La_{0.8}][Mn_{0.6}Pt_{0.1}Ti_{0.3}]O_3$$

$$[Cs_{0.1}La_{0.7}Nd_{0.2}][Co_{0.4}Cr_{0.4}Ir_{0.1}Pt_{0.1}]O_3$$

$$[Na_{0.5}RE(III)_{0.95}][Cu_{0.1}Cr_{0.2}Ni_{0.2}Fe_{0.3}Ru_{0.2}]O_3$$

$$[Cs_{0.4}Nd_{0.6}][Co_{0.3}Mn_{0.2}Pt_{0.2}Nb_{0.3}]O_3$$

$$[Sr_{0.5}Ba_{0.5}][Ni_{0.45}Pt_{0.1}V_{0.45}]O_3$$

$$[K_{0.5}La_{0.5}][Ti_{0.8}Ru_{0.2}]O_3$$

$$[Na_{0.5}La_{0.5}][Ti_{0.95}Pt_{0.05}]O_3$$

$$[Rb_{0.5}La_{0.5}][Mo_{0.9}Pt_{0.1}]O_3$$

$$[Rb_{0.5}Nd_{0.5}][Ti_{0.95}Pd_{0.05}]O_3$$

$$[Cs_{0.5}Nd_{0.5}][Ti_{0.9}Pd_{0.033}Pt_{0.033}Ru_{0.033}]O_3$$

$[Pb_{0.2}Sr_{0.8}][Cu_{0.2}Rh_{0.2}Nb_{0.6}]O_3$ $[Ba_{0.9}Pb_{0.1}][Ti_{0.8}Ru_{0.2}]O_3$ $[Sr_{0.6}Ca_{0.4}][V_{0.9}Pt_{0.1}]O_3$ $[Sr_{0.9}Pb_{0.1}][Ti_{0.95}Ir_{0.05}]O_3$ $[Ca_{0.5}Ba_{0.5}][Ti_{0.9}Pt_{0.1}]O_3$ $[Ba_{0.3}Nd_{0.7}][Mn_{0.4}Cr_{0.4}Ru_{0.1}Nb_{0.1}]O_3$ $[Sr_{0.2}La_{0.8}][Co_{0.9}Ir_{0.1}]O_3$ $[Pb_{0.1}La_{0.9}][Cu_{0.1}Cr_{0.7}Ru_{0.2}]O_3$ $[Ca_{0.3}La_{0.7}][Cd_{0.1}Fe_{0.5}Pt_{0.1}Ti_{0.3}]O_3$ $[Pb_{0.5}La_{0.5}][Mn_{0.9}Ir_{0.1}]O_3$ $[Ba_{1/2}La_{1/2}][Mn_{1/2}Ti_{1/3}Ru_{1/6}]O_3$ $[Sr_{1/2}La_{1/2}][Mn_{1/2}Ti_{1/3}Pt_{1/6}]O_3$ $[Ca_{1/2}Y_{1/2}][Mn_{1/3}RH_{1/6}Ti_{1/2}]O_3$ $[Pb_{2/3}La_{1/3}][Fe_{1/3}Ti_{1/3}Zr_{1/6}Ru_{1/6}]O_3$ $[Pb_{1/3}Sr_{1/3}La_{1/3}][Mn_{1/3}Ti_{1/2}Pt_{1/6}]O_3$ $[Ba_{0.1}RE_{0.9}][Ti_{0.9}Pt_{0.1}]O_3$ $[Ba_{0.1}La_{0.9}][Ti_{0.9}Pt_{0.1}]O_3$ $[Sr_{0.1}La_{0.9}][Cu_{0.1}Ni_{0.4}Co_{0.4}Os_{0.1}]O_3$ $[Sr_{0.2}La_{0.8}][Mn_{0.8}Ir_{0.2}]O_3$ $[Ba_{0.4}La_{0.6}][Fe_{0.6}Ir_{0.1}]O_3$ $[Sr_{0.2}La_{0.8}][Co_{0.8}Ru_{0.2}]O_3$ $[Sr_{0.1}La_{0.9}][Ni_{0.9}Pt_{0.1}]O_3$ $[Sr_{0.2}La_{0.8}][Co_{0.9}Pd_{0.1}]O_3$ $[Sr_{0.3}La_{0.7}][Fe_{0.9}Ru_{0.1}]O_3$ $[Sr_{0.2}La_{0.8}][Co_{0.9}Rh_{0.1}]O_3$ $[Ba_{0.4}La_{0.6}][Co_{0.9}Pt_{0.1}]O_3$ $[Sr_{0.4}La_{0.6}][Co_{0.9}Pt_{0.1}]O_3$ $[La_{0.6}Nd_{0.4}][Cu_{0.05}Fe_{0.9}Pt_{0.05}]O_3$ $[La_{3/4}Ce_{1/4}][Fe_{7/8}Ru_{1/8}]O_3$ $[La_{1/2}Gd_{1/2}][Mn_{1/2}Co_{1/3}Rh_{1/6}]O_3$ $[K_{1/3}Ba_{1/3}La_{1/3}][Al_{1/3}Ti_{1/6}Ru_{1/6}Nb_{1/3}]O_3$ $Rb_{0.2}Ba_{0.2}La_{0.6}][Ag_{0.1}Co_{0.4}Ti_{0.3}Nb_{0.1}Os_{0.1}]O_3$ $[Rb_{0.1}Ba_{0.1}Nd_{0.8}][Cu_{0.2}Co_{0.3}Zr_{0.4}Ru_{0.1}]O_3$ $[Cs_{0.2}Ba_{0.2}La_{0.6}][Cu_{0.2}Ti_{0.6}Ru_{0.2}]O_3$ $[K_{0.025}Pb_{.05}Nd_{0.925}][Al_{0.9}Ru_{0.1}]O_3$ $[K_{0.3}Cs_{0.7}][Zr_{0.5}Mo_{0.4}Os_{0.1}]O_3$ $[Rb_{1/4}K_{3/4}][Sb_{5.6}Os_{1.6}]O_3$ $[Rb_{0.2}Ba_{0.8}][Li_{0.1}Cu_{0.1}Cr_{0.3}Ru_{0.05}Ir_{0.05}Mo_{0.2}W_{0.2}]O_3$ $[Cs_{0.3}Nd_{0.7}][Na_{0.1}Fe_{0.4}Al_{0.1}Ir_{0.2}W_{0.2}]O_3$ $[Rb_{0.1}La_{0.9}][Mg_{0.2}Ni_{0.3}Zn_{0.2}W_{0.1}Re_{0.1}Os_{0.1}]O_3$ $[K_{0.5}La_{0.5}][Sn_{0.8}Ru_{0.2}]O_3$ $[Cs_{0.4}Nd_{0.6}][Co_{0.3}Mn_{0.2}Pt_{0.2}Nb_{0.3}]O_3$ $[K_{1/2}La_{1/2}][Cr_{1/2}Ta_{1/3}Os_{1/6}]O_3$ $[Ba_{0.9}Sr_{0.1}][Ag_{0.1}Ti_{0.8}Os_{0.1}]O_3$ $[Sr_{1/2}Ba_{1/2}][Na_{1/2}R_{1/3}Os_{1/6}]O_3$ $[Pb_{0.2}Ba_{0.8}][Li_{0.1}Cr_{0.4}Co_{0.4}W_{0.05}Os_{0.05}]O_3$ $[Ba_{1/2}Pb_{1/2}][Na_{1/4}Rh_{1/4}W_{1/2}]O_3$ $[Ba_{0.9}Cd_{0.1}][Li_{0.1}Ni_{0.3}Cr_{0.2}Co_{0.3}W_{0.05}Os_{0.05}]O_3$ $[Ca_{0.1}Ba_{0.9}][Ag_{0.1}Cu_{0.1}Mn_{0.05}Cr_{0.2}Pt_{0.1}V_{0.05}Nb_{0.2}Os_{0.1}Re_{0.1}]O_3$ $[Pb_{0.6}Sr_{0.4}][Mg_{1/6}Pd_{1/6}Ti_{1/3}W_{1/3}]O_3$ $[Ba_{1/2}Sr_{1/2}][Al_{1/2}Mo_{1/3}Os_{1/6}]O_3$ $[Ca_{1/2}Ba_{1/2}][Mg_{1/2}W_{1/3}Os_{1/6}]O_3$ $[Sr_{0.5}Ba_{0.5}][Zr_{0.9}Ir_{0.1}]O_3$ $[Pb_{0.1}Sr_{0.2}La_{0.7}][Li_{0.2}Mn_{0.4}Al_{0.1}Ti_{0.1}W_{0.1}Os_{0.1}]O_3$ $[Ca_{0.3}La_{0.7}][Cd_{0.1}Fe_{0.5}Pt_{0.1}Ti_{0.3}]O_3$ $[Ba_{0.1}La_{0.9}][Fe_{0.7}Rh_{0.2}Zr_{0.1}]O_3$ $[SR_{0.2}La_{0.8}][Mn_{0.7}Al_{0.2}Ru_{0.1}]O_3$ $[Sr_{0.2}La_{0.8}][Al_{0.8}Ru_{0.2}]O_3$ $[Sr_{0.2}L_{0.8}][Al_{0.7}Rh_{0.1}Mn_{0.2}]O_3$ $[Ba_{0.1}RE_{0.9}][Ti_{0.9}Pt_{0.1}]O_3$ $[SR_{0.06}La_{0.94}][Al_{0.80}Co_{0.16}Ru_{0.04}]O_3$ $[RE(III)][Li_{0.2}Na_{0.1}Ag_{0.1}Cr_{0.15}Mn_{0.15}Pt_{0.1}Nb_{0.1}Re_{0.1}]O_3$ $[La_{0.4}Nd_{0.6}][Cu_{0.1}Cr_{0.2}Co_{0.2}Ni_{.2}Fe_{.2}Ru_{.1}]O_3$ $[La_{0.5}Nd_{0.5}][Li_{0.3}Mn_{0.3}Ti_{0.3}Os_{0.1}]O_3$ $[RE][Ni_{0.85}Ir_{0.15}]O_3$ $[RE][Cu_{0.1}Co_{0.8}Ru_{0.1}]O_3$ $[RE][Mn_{0.9}Ir_{0.1}]O_3$ $[RE][Cu_{0.1}Al_{0.8}Ir_{0.1}]O_3$ $[La_{1/2}Pr_{1/2}][Al_{1/2}Ni_{1/3}Rh_{1/6}]O_3$ $[RE][Fe_{0.8}Cr_{0.1}Rh_{0.1}]O_3$ $[RE][Mg_{0.5}Ti_{0.45}Ir_{0.05}]O_3$ $[La_{1/2}Nd_{1/2}][Mg_{1/2}Ti_{1/3}Ru_{1/6}]O_3$ $[RE(III)][Cu_{0.5}Ti_{0.4}Pt_{0.1}]O_3$ $[Re(III)][Cd_{0.4}Pd_{0.1}Ti_{0.5}]O_3$ $La_{3/4}Ce_{1/4}][Fe_{7/8}Ru_{1/8}]O_3$

COMPOUND PREPARATION

The compounds of this invention can be prepared by heating mixtures of metal oxides, hydroxides, metals, and/or metal salts for sufficient times at temperatures which permit spontaneous formation of the compounds. The mixture of materials which are heated are preferably finely subdivided and intimately mixed before heating and are thoroughly ground and mixed by any conventional techniques several times during the heating period, since the compounds are in many instances formed by atomic diffusion, without melting of any of the starting or potential intermediate materials, and are subject to coating of unreacted particles by reaction products. The heating times and temperatures required for the formation of significant amounts of these catalytic compounds depend upon the particular compositions being formed, the required times usually being shorter at higher temperatures. Temperatures above about 800° C. are usually suitable for the formation of these compounds but temperatures above about 900° C. are usually preferred with firing times of hours to days with occasional intermediate grinding and mixing and temperatures of 1,000° to 1,500° C. may be used.

In forming the compounds of this invention, stoichiometric mixtures of starting materials are preferably heated in air or other oxygen-containing gas mixture.

The starting materials used in preparing the compounds of this invention by anhydrous processes can be any salts which are converted to oxides by prolonged heating in oxidizing atmospheres at the temperatures at which these compositions are formed. For example, they can be carbonates, salts of carboxylic acids (e.g., acetates, oxalates, tartrates, etc.), salts of the acids of sulfur (e.g., sulfides, sulfites, sulfates, etc.), halogen acid salts which are converted to oxides without volatilization (e.g., ruthenium chloride, strontium chlorate, barium perchlorate), salts of the acids of nitrogen (e.g., nitrates, nitrites, etc.). Preferably they are carbonates, nitrates or sulfates. The presence of small amounts of the salts of other such acids in a mixture which is predominately oxides or carbonates is usually not significantly deleterious since such salts are converted into oxides during heating to prepare these catalytic compositions.

The compounds of this invention are presumed to function as catalysts primarily at their surfaces, so compositions with significant surface areas are preferred. The surface areas of compounds prepared by heating mixtures of materials can be increased by grinding and other conventional methods. Catalytically active compounds with surface areas between about 0.1 and 10 square meters per gram (determined by the well-known Brunauer-Emmett-Teller method) can be obtained. Compounds with surface areas greater than about one square meter per gram are preferred. The surface area of these compounds remains relatively unchanged during use by virtue of their compositional and structural stability at high temperatures.

CATALYST FORMS

The compounds desribed herein can be used as catalysts in the form of free-flowing powders, for instance in fluid-bed reaction systems, or in the form of shaped structures providing efficient contact between the catalyst and the reactant gases. Such catalyst structures can contain minor (e.g., less than about 50%) or major (e.g., more than about 50% to about 98%) amounts of catalytically inert materials. These inert materials can be either porous or solid, with the catalytic compounds primarily on the surfaces thereof or more or less uniformly dispersed throughout. For example, the powdered compounds can be formed into porous catalyst pellets in which they are dispersed throughout by conventional techniques employing pellet presses, rolling mixers, extruders, etc. Preferably such pellets contain suitable dispersants, lubricants, and/or binders.

One particularly useful dispersant-binder for use in forming extruded pellet catalyst structures containing the catalyst compositions described herein is a high-purity alpha alumina monohydrate sold by the Continental Oil Co. as "Dispal". This material is a white, free-flowing powder of small particle size formed of very fine ultimate crystallites having a surface area of about 200 square meters per gram and a bulk density of 45 to 50 pounds per cubic foot. It forms thixotropic dispersions at concentrations of about 3% to 30% in water containing about 4% to 6% commercial concentrated (37% HCl) hydrochloric acid based on the weight of alumina, which dispersions become thicker upon standing. Thick dispersions containing about 20 to 30 parts of the alumina monohydrate and about 100 to 150 parts of acidified water per 100 parts of a catalytic composition having a surface area of about two square meters per gram can be extruded through small orifices to obtain structures which retain their form when wet and have significant strength when dried of gross water and heated at about 500° C. to about 900° C. to remove at least a part of the water present in the alumina monohydrate.

The compounds of this invention are preferably employed as catalysts in the form of coatings on suitable refractory supports. Such supports can be in any convenient shape, including powders, granules, spheres, rings, tablets, pills, bars, tubes, extruded shapes, rolls, spirals, screens, beads, coils, and the more elaborate shapes (e.g., corrugated and flat sheets, honeycombs, etc.) prepared by a variety of methods and recently available to the art.

Suitable supports can be composed solely or primarily of silica, of ceramic compositions having softening or melting temperatures above the temperatures involved in forming or coating these catalytic compositions on such supports, of natural silicious materials such as diatomaceous earths and pumice, as well as of alundum, gamma alumina, silicon carbide, titania, zirconia, and other such refractory materials.

A particularly useful refractory support is an alumina ceramic described in U.S. Pat. Nos. 3,255,027; 3,338,995; and 3,397,154. Such materials can be made by coating an aluminum foil fabricated into a shaped structure having the desired final configuration with a fluxing agent and firing to convert the aluminum into substantially pure alpha alumina. Suitable fluxing agents include alkali and alkaline earth metal oxides and compounds which yield such oxides on firing (e.g. sodium silicate) which serve to prevent inhibition of oxidation of the aluminum due to oxide scum formation on the surface of the aluminum. One such alumina contains, for example, small amounts of magnesium aluminate and aluminum silicate. As disclosed in the Talsma patents, honeycomb structures can be made by placing flux-coated corrugate sheets of aluminum together node-to-node and firing. Similar structures can be obtained by applying a composition containing aluminum powder, a binder, a fluxing agent, and a liquid carrier to a corrugated paper honeycomb structure and firing in an oxidizing atmosphere to burn out the paper structure and oxidize the aluminum to alumina. Honeycomb structures of such alumina compositions can be purchased from the Industrial Chemicals Department, E. I. du Pont de Nemours & Company, under the trade name "Torvex". The preferred structures have nominal cell sizes 1/16 to ⅛ inch.

The compounds can be applied to suitable supports in several ways. For example, they can be formed upon supports which are sufficiently high melting and nonreactive by soaking the support structure in a solution of a suitable mixture of salts, drying, and firing the impregnated support to a temperature and for a time sufficient to form the catalytic structure. Alternately, the compounds can be preformed and applied to the support structure in a slurry which can optionally contain diluent materials which can also be catalytic materials. A particularly useful dispersant-binder for use in such slurry-coating processes is the "Dispal" alpha alumina monohydrate described hereinabove as a dispersant-binder useful in making extruded catalyst structures. Typically, acidified dispersions containing about 4% to 10% alpha alumina hydrate and a comparable amount of the ground catalytic composition are prepared, pieces of the support material are coated with the dispersion, the coated pieces are dried, and the dried coated pieces are heated to a temperature and for a time (e.g., for 2 to 24 hours at 500° C. to 900° C.) to remove at least a portion of the water from the alpha alumina monohydrate. Other support materials and techniques for applying catalytic materials to supports, useful and effective with the compounds of this invention, are described by Sowards and Stiles in U.S. Pat. No. 3,518,206 and by Aarons in U.S. Pat. No. 3,554,929.

ADVANTAGES OF COMPOUNDS AS CATALYSTS

The metal oxides of the present invention are stable and durable at high temperatures and have been shown to catalyze the oxidation of hydrocarbons and carbon monoxide and also the reaction between nitrogen oxide ($NO_x$) and carbon monoxide to give nitrogen and carbon dioxide. They are not poisoned by the lead compounds present in the exhaust of internal combustion engines operated on leaded gasoline. Accordingly, an important use of the catalysts of this invention is the removal of noxious components from the exhaust of internal combustion engines. For this purpose the catalysts are preferably supported on shaped alumina supports, although other supports inert to the exhaust gas at the operating temperature may be used.

As formed by heating and grinding, the compounds of the present invention are obtained in the form of a crystaline powder. Particularly effective and durable catalysts for use in treating the exhaust gases of internal combustion engines operating with leaded fuels are obtained when this powder is supported on an alumina support, preferably the honeycomb-structured alumina supports sold under the trade name "Torvex" described hereinabove. The catalyst powder should be applied to the surface, together with a binder to affix the same to the support, in an amount sufficient to coat the entire surface, usually in an amount of from 2 to 25% by weight of the support.

The catalytic compounds of the present invention may be employed to catalyze other reactions similar to the reactions occurring in the purification of internal combustion engine exhausts. For such applications, where lead compounds are absent, a wider variety of support materials may be employed such as pellets or other shaped structures of mullite, cordierite and silica.

This invention is further illustrated by the following specific examples which should not, however, be construed as fully delineating the scope of the discovery.

EXAMPLE 1

Preparation of Catalytic Composition

A metal oxide of the nominal composition $[Sr_{0.2}La_{0.8}][Co_{0.8}Ru_{0.2}]O_3$ was prepared by mixing 10.96 grams of lanthanum oxide ($La_2O_3$), 2.48 grams of strontium carbonate ($SrCO_3$), 8.00 grams of cobalt carbonate ($CoCO_3$), and 2.24 grams ruthenium oxide ($RuO_3$), grinding and mixing until homogeneous, and heating the mixture in air in a platinum boat inside a "Vycor" brand silica tube closed with glass wool plugs at 950°–1000° C. for about 4 days during which the mixture was occasionally reground and remixed. There was no significant evidence of volatilization of ruthenium oxide or of its condensation in the cooler portions of the tube or in the glass wool plugs in the ends of the tube during the heating of the mixture. The resulting composition was ground and passed through a 325-mesh Tyler standard sieve screen.

APPLICATION OF CATALYTIC COMPOSITION TO A SUPPORT

One gram of "Dispal"M alumina dispersant and binder was mixed with 17 milliliters of water containing three drops of commercial concentrated hydrochloric acid. To this mixture was added 7.5 grams of the catalytic composition $[Sr_{0.2}La_{0.8}][Co_{0.8}RU_{0.2}]3$ described above to obtain a stable thixotropic slurry. A cylinder of alumina ceramic honeycomb with straight-through cells sold under the trade name "Torvex" was soaked in water. This cylinder weighed 5.77 grams, was about 2.5 centimeters in diameter and thickness and nominally had a cell size of 1/16 inch, wall thickness of 0.018 inch, open area of 50%, 253 hexagonal holes per squre inch, and a nominal geometric surface area of 462 square feet per cubic foot. The water-soaked cylinder was dipped into the slurry of the catalytic composition, the gross excess of slurry was removed by blowing the cylinder with air, the cylinder was dried, and the cylinder coated with the catalytic composition and binder was heated for about 30 minutes in a muffle furnace at about 700° C. The cooled support was again dipped into the slurry, blown free of gross slurry, and dried and was then heated for about two hours in the muffle furnace at about 650° C. The support with adherent catalytic composition and binder weighed 7.74 grams, or 25.5% more than the dry uncoated support. It contained about 0.0106 gram of the catalytic composition and binder per square centimeter of geometric surface.

CATALYTIC ACTIVITY IN THE REDUCTION OF NITRIC OXIDE BY CARBON MONOXIDE

The Torvex ceramic honeycomb cylinder coated with $[Sr_{0.2}La_{0.8}][Co_{0.8}Ru_{0.2}]O_3$ and binder was installed in a stainless steel chamber with a nominal internal diameter of 2.5 centimeters, height of 2.5 centimeter, and volume of 12.3 cubic centimeters. Nitrogen containing about 2000 parts per million of nitric oxide and about 10,000 parts per million of carbon monoxide was passed through the chamber at a nominal hourly space velocity of about 40,000 hr.$^{-1}$ and pressure of 1 pound per square inch gage while the feed gas and the catalyst chamber were heated in a programmed manner so that the temperature of the gas entering the catalyst chamber increased from about 60° C to about 600° C over about 90 minutes. Samples of the inlet and exit gases were obtained periodically. The nitric oxide in these samples was oxidized to nitrogen dioxide and the resulting gas mixture was analyzed by a modification of the colorimetric procedure described by B. E. Saltzman in "Analytical Chemistry", Volume 26, pages 1949–1955 (1954). The percent reduction in the nitric oxide concentration of the gas upon passing through the catalyst chamber was found to be nil at a catalyst chamber inlet temperature of 200° C, 14.3% at 300° C, 97.1% at 400° C, 98.6% at 500° C, and 98.6% at 600° C. The catalyst temperature was about 660° C with the gas entering the catalyst chamber at 600° C. From a smooth curve through a plot of these results it was estimated that the conversion of nitric oxide was 25% at about 315° C, 50% at about 340° C, and 90% at about 390° C and that the "light-off" temperature (the intercept with the temperature axis of an extrapolation of the portion of the curve in which the degree of conversion changed rapidly with temperature) was about 280° C. The light-off temperature and the temperatures of 25%, 50%, and 90% conversion after heating the catalyst-coated honeycomb cylinder at about 900° C for 116 hours and for 216 hours are given in Table I along with similar data from evaluations of the catalytic activity of the compositions described in Examples 2 through 9.

Catalytic Activity in the Oxidation of Carbon Monoxide

The catalytic activity of the above-described Torvex cylinder coated with [$Sr_{0.2}La_{0.8}$] [$Co_{0.8}Ru_{0.2}$]$O_3$ in the oxidation of carbon monoxide was determined in a similar apparatus and by a similar procedure. Nitrogen containing about 10,000 parts per million of carbon monoxide and 10,000 parts per million of oxygen was passed through the catalyst chamber and the entering and exiting gas mixtures were analyzed chromatographically using a column containing granules of "Linde" 13X molecular sieve. The conversion of carbon monoxide was found to be 6.6% with a catalyst chamber inlet temperature of 140° C, 7.1% at 200° C, 5.4% at 245° C, and 100% at 275° C and at 305° C. The temperature of the catalyst was 330° C with a catalyst chamber inlet temperature of 275° C. From a smooth curve through a plot of these results it was estimated that the conversion of carbon monoxide was 25% at about 250° C, 50% at about 260° C, and 90% at about 270° C and that the light-off temperature was about 245° C. The light-off temperatures and the temperatures of 25%, 50%, and 90% conversion after heating the catalyst-coated honeycomb cylinder at about 900° C for 116 hours and for 216 hours are given in Table I along with similar data from evaluations of the catalytic activity of other compositions described in Examples 2 through 10.

Catalytic Activity in the Oxidation of Propane

The above-described "Torvex" ceramic honeycomb cylinder coated with [$Sr_{0.2}La_{0.8}$] [$Co_{0.8}Ru_{0.2}$]$O_3$ and binder was heated in a muffle furnace at about 900° C for 116 hours. The catalytic activity of the cylinder in the oxidation of propane was then determined in a similar apparatus and by a similar procedure. Nitrogen containing about 1300 parts per million of propane and 8800 parts per million of oxygen was passed through the catalyst chamber and the entering and exiting gases were analyzed chromatographically using a column containing 80–100 mesh "Poropak" Q. The conversion of propane was found to be 7.9% with a catalyst chamber inlet temperature of 190° C, 8.9% at 285° C, 29.9% at 385° C, 78.0% at 505° C, and 94.6% at 600° C. The catalyst temperature was 605° C with a catalyst chamber inlet temperature of 505° C. From a smooth plot of these results it was estimated that propane conversion was 25% at about 250° C, 50% at about 415° C, 75% at about 490° C and 90% at about 565° C and that the light-off temperature was about 290° C. The light-off temperature and the temperatures of 25%, 50%, and 90% conversion after heating the catalyst-coated honeycomb at about 900° C for 216 hours are given in Table I along with similar data from evaluations of the catalytic activity of other compositions described in Examples 2 through 10.

TABLE I (Part A)

| Catalytic Activity of Compositions of Examples 1 Through 5 | | | | | | | | | | | |
|---|---|---|---|---|---|---|---|---|---|---|---|
| Example | 1 | | | 2 | 3A | 3B | | 4 | | 5 | |
| Hours at 900° C. | 0 | 116 | 216 | 0 | 0 | 0 | 220 | 0 | 620 | 0 | 100 |
| Reduction of Nitric Oxide | | | | | | | | | | | |
| "Light-off" temp., ° C. | 280 | 280 | 285 | 265 | 255 | 205 | 275 | 290 | 285 | 295 | 290 |
| 25% conversion, ° C. | 315 | 315 | 315 | 300 | 290 | 265 | 320 | 320 | 310 | 320 | 325 |
| 50% conversion, ° C. | 340 | 340 | 345 | 330 | 325 | 330 | 360 | 345 | 340 | 350 | 355 |
| 90% conversion, ° C. | 390 | 390 | 390 | 375 | 385 | 465 | 470 | 390 | 385 | 390 | 410 |
| Oxidation of Carbon Monoxide | | | | | | | | | | | |
| "Light-off" temp., ° C. | 245 | 205 | 210 | 220 | | 175 | 200 | 205 | 210 | 205 | 190 |
| 25% conversion, ° C. | 250 | 215 | 235 | 240 | | 230 | 240 | 215 | 225 | 230 | 275 |
| 50% conversion, ° C. | 260 | 230 | 260 | 255 | | 280 | 285 | 235 | 245 | 250 | 310 |
| 90% conversion, ° C. | 270 | 255 | 300 | 290 | | 395 | 425 | 255 | 270 | 315 | 550 |
| Oxidation of Propane | | | | | | | | | | | |
| "Light-off" temp., ° C. | | 300 | 275 | 265 | 400 | 275 | 250 | 355 | 285 | 300 | 350 |
| 25% conversion, ° C. | | 350 | 360 | 465 | 495 | 425 | 425 | 430 | 395 | 415 | 535 |
| 50% conversion, ° C. | | 415 | 425 | 530 | 555 | 535 | 545 | 470 | 485 | 500 | — |
| 90% conversion, ° C. | | 565 | 590 | — | — | — | — | 545 | — | — | — |

TABLE I (Part B)

Catalytic Activity of Compositions of Examples 6 Through 10

| Example | 6 | | 7 | | 8 | | 9A | | 9B | | 10 | |
|---|---|---|---|---|---|---|---|---|---|---|---|---|
| Hours at 900° C.: | 0 | 200 | 0 | 100 | 0 | 300 | 0 | 100 | 0 | 100 | 0 | 100 |
| Reduction of Nitric Oxide | | | | | | | | | | | | |
| "Light-off" temp., ° C. | 290 | 250 | 310 | 270 | 325 | 285 | 295 | | 290 | 275 | 280 | 260 |
| 25% conversion, ° C. | 325 | 280 | 330 | 305 | 365 | 325 | 320 | | 330 | 315 | 305 | 295 |
| 50% conversion, ° C. | 345 | 315 | 350 | 335 | 410 | 370 | 350 | | 370 | 345 | 335 | 330 |
| 90% conversion, ° C. | 390 | 370 | 380 | 385 | 485 | 470 | 395 | | 435 | 395 | 380 | 385 |
| Oxidation of Carbon Monoxide | | | | | | | | | | | | |
| "Light-off" temp., ° C. | 220 | 205 | 185 | 210 | 210 | 170 | 150 | | 245 | 240 | 240 | 210 |
| 25% conversion, ° C. | 235 | 225 | 200 | 230 | 225 | 205 | 215 | | 275 | 260 | 270 | 225 |
| 50% conversion, ° C. | 250 | 245 | 210 | 245 | 240 | 240 | 245 | | 305 | 290 | 305 | 240 |
| 90% conversion, ° C. | 275 | 275 | 275 | 270 | 295 | <290 | 290 | | 350 | 345 | 370 | 265 |
| Oxidation of Propane | | | | | | | | | | | | |
| "Light-off" temp., ° C. | 390 | 260 | 280 | 270 | 385 | 315 | 325 | | 340 | 320 | 500 | 340 |
| 25% conversion, ° C. | 455 | 325 | 445 | 360 | 450 | 455 | 415 | | 440 | 380 | 500 | 425 |
| 50% conversion, ° C. | 515 | 395 | 505 | 425 | 515 | 530 | 465 | | 510 | 445 | — | 505 |
| 90% conversion, ° C. | — | — | — | — | — | — | 580 | | — | — | — | — |

EXAMPLE 2

Preparation of Catalytic Composition

A metal oxide having the nominal composition [$Sr_{0.2}La_{0.8}$] [$Co_{0.9}Ru_{0.1}$]$O_3$ was prepared by dissolving 351.8 grams of lanthanum nitrate ($La(NO_3)_3 \cdot 5H_2O$), 44.5 grams of strontium nitrate ($Sr(NO_3)_2$), and 275.5 grams of cobalt nitrate ($Co(NO_3)_2 \cdot 6H_2O$) in about 4 liters of water, adding quickly and with rapid agitation a solution of 402.5 grams of potassium carbonate ($K_2CO_3$) in about two liters of water, separating the precipitated mixture of carbonates, drying the separated carbonates overnight at 120° C, adding 14.0 grams of ruthenium oxide ($RuO_2$), mixing thoroughly, heating in a muffle furnace at about 1000° C for 1 hour, grinding and mixing thoroughly, and then heating at about 950° C for 4 days during which the composition was ground and mixed at 3 intermediate times. The resulting black composition was ground and passed through a 325-mesh Tyler standard sieve screen. It contained 4.0% ruthenium, determined by X-ray fluorescence spectroscopy and comparable to the 4.22% ruthenium indicated by the formula and included in the preparation.

Another preparation showed that an equivalent composition was obtained when ruthenium oxide was added to a precipitated mixture of carbonates before separating the mixture from the supernatant liquid.

The X-ray diffraction pattern of the above-described catalytic composition [$Sr_{0.2}La_{0.8}$] [$Co_{0.9}Ru_{0.1}$]$O_3$ indicated the composition to be a single phase having a structure of the perovskite type similar to that of La-$CoO_3$. The precision of cell dimensions calculated from this pattern was reduced by the presence in the pattern of broad and/or weak lines reflecting, in part, the introduction of small fractions of strontium and ruthenium into $LaCoO_3$. Crystal cell dimensions calculated from some of the lines of the X-ray pattern indicated a cell volume of 56.39 cubic Angstroms per formula unit, which value is significantly different from the corresponding dimensions of the known perovskites $LaCoO_3$ (cell volume 55.960), $Sr_{0.2}La_{0.8}CoO_3$ (cell volume 56.13) and $SrRuO_3$ (cell volume 60.45). The different cell volume reflects the expected enlargement of the crystal cell upon introduction of a small amount of ruthenium into the crystal structure of $Sr_{0.2}La_{0.8}CoO_3$.

APPLICATION TO A SUPPORT

The above-described catalyst composition [$Sr_{0.2}La_{0.8}$] [$Co_{0.9}Ru_{0.1}$]$O_3$ was applied to pieces of Torvex alumina ceramic honeycomb substantially as described in Example 1, using a thick thixotropic slurry containing 53 grams of Dispal M alumina dispersant and binder, 3 milliliters of commercial concentrated hydrochloric acid, and 20 grams of the catalyst composition in 453 milliliters of water. The ceramic honeycomb pieces were of two types: one piece like that described in Example 1 and 6 pieces each about 5.0 centimeters in diameter and 2.5 centimeters thick and weighing about 34 grams, with a nominal cell size of 1/8 inch, wall thickness of 0.03 inch, open area of 60%, area per roughly hexagonal hole of 0.01 square inch, and geometric surface area of 384 square feet per cubic foot. The dried and heated coated pieces weighed about 20% more than the dried untreated pieces. The larger coated pieces contained about 0.0127 gram of the catalyst composition and the smaller piece contained about 0.0107 gram of the catalyst composition per square centimeter of the geometric surface area.

CATALYTIC ACTIVITY IN REDUCTION OF NITRIC OXIDE BY CARBON MONOXIDE

The catalytic activity of the above-described smaller cylinder of Torvex alumina ceramic honeycomb coated with the composition [$Sr_{0.2}La_{0.8}$] [$Co_{0.9}Ru_{0.1}$]$O_3$ and binder in the reduction of nitric oxide by carbon monoxide and in the oxidation of carbon monoxide was determined substantially as described in Example 1. The light-off temperatures and temperatures of 25%, 50% and 90% conversion are given in Table I.

CATALYTIC ACTIVITY WITH AUTOMOTIVE EXHAUST GASES

The 6 larger pieces of Torvex alumina ceramic honeycomb coated with [$Sr_{0.2}La_{0.8}$] [$Co_{0.9}Ru_{0.1}$]$O_3$ and binder, weighing in all 246 grams, were mounted in an insulated stainless steel chamber bolted to the exhaust port of a Kohler Model K91 single-cylinder gasoline engine (8.86 cubic inches displacement, nominally 4 horsepower) fitted with an electronic spark ignition system and loaded with a heavy fan. The engine was operated at 3000 revolutions per minute at an air/fuel ratio of approximately 13.9, using an unleaded premium grade gasoline to which was added 2.0 grams per gallon of lead as Motor Mix tetraethyllead antiknock compound containing the usual amounts of ethylenedichloride and ethylenedibromide scavengers and a commercial premium grade heavy duty SAE 40 grade lubricating oil containing a typical combination of additives including phosphorus, sulfur, etc. The engine was overhauled at intervals of about 300 hours. Under these operating conditions the exhaust gas temperature was 690°-750° C (typically 720° C), the nominal gas hourly space velocity of exhaust gas through the catalyst chamber was about 18,000 hr.$^{-1}$, and the exhaust gas contained about 2.8% carbon monoxide, 0.1% nitrogen oxides, and 0.9% oxygen. The nitrogen oxides were determined as described in Example 1 and the carbon monoxide and oxygen were determined chromatographically after condensing most of the water in the exhaust gas in a trap cooled by an ice bath and passing the remaining gas through a small-pore filter to remove entrained and particulate matter.

Figure 2:
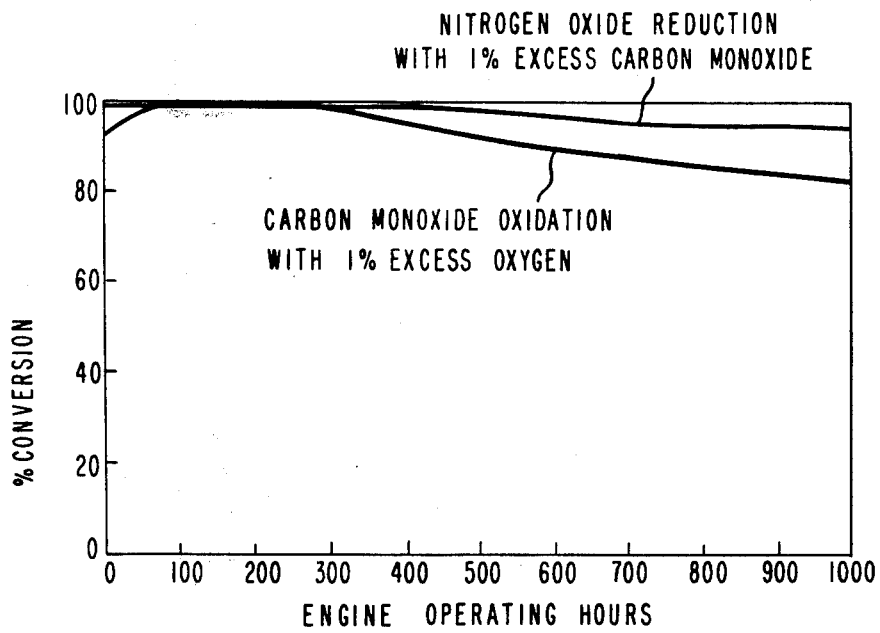
FIG. 2 shows the percentage conversion of nitrogen oxides and carbon monoxide as a function of time using the catalyst of Example 2.

After each 100 hours of steady-state operation under these conditions, the air/fuel ratio was increased to obtain in the exhaust gas about 3% excess oxygen, defined as Excess $O_2$(%) = Measured $O_2$(%) − 0.5 [Measured CO(%)]. The engine and catalyst were allowed to come to temperature equilibrium and the conversions of nitrogen oxides and of carbon monoxide were determined. This procedure was repeated with stepwise reduction of the air/fuel ratio until the exhaust gas contained about 3% excess carbon monoxide, defined as Excess CO (%) = measured CO (%) − 2 [Measured $O_2$ (%)]. The conversions of nitrogen oxides and of carbon monoxide thus determined with different exhaust-gas compositions after 100 and 1000 hours of engine opertion are shown in FIG. 1. Conversions of nitrogen oxides and of carbon monoxide obtained after 100-hour intervals from plots like that of FIG. 2 are shown in Table II and in FIG. 2. The temperature of the catalyst was typically 820° C during steady-state operation. After 1000 hours the catalyst weighed 223 grams, representing a net loss from the catalyst chamber of 23 grams. The gasoline consumed during the 1000-hour test contained 468 grams of lead. During the test a total of 3075 grams of makeup oil was added to the engine crankcase.

EXAMPLE 3

Preparation of Catalytic Composition

Another metal oxide composition having the nominal formula $[Sr_{0.2}La_{0.8}][Co_{0.9}Ru_{0.1}]O_3$ was prepared by dissolving 41.2 grams of lanthanum nitrate ($La(NO_3)_3 \cdot 5H_2O$), 5.5 grams of strontium nitrate ($Sr(NO_3)_2$), 335.3 grams of cobalt nitrate ($Co(NO_3)_2 \cdot 6H_2O$) and 30.0 grams of ruthenium chloride ($RuCl_3 \cdot 2H_2O$, containing about 41.5% Ru) in about 4 liters of water, adding slowly and with vigorous stirring a solution of 509.1 grams of potassium carbonate ($K_2CO_3$) in 1700 milliliters of water, separating the precipitated mixture of carbonates, drying at 120°0 C, under reduced pressure, heating for one hour at 1000° C, grinding and mixing thoroughly, and heating for an additional 3 days at 1000° C during which the bulk volume of the composition reduced from about 1200 milliliters to about 300 milliliters. The resulting black composition was ground and passed through a 325-mesh screen sieve. The X-ray diffraction spectrum of this composition was essentially identical with that of a composition of Example 2 and was substantially unchanged by heating for an additional 100 hours at 900° C.

Application of Catalytic Composition To a Support

Procedures similar to those of Example 2 were used to apply the above-described catalytic composition $[Sr_{0.2}La_{0.8}][Co_{0.9}Ru_{0.1}]O_3$ to cylinders of Torvex alumina ceramic honeycomb of the 2 sizes described in Example 2. The coated cylinders weighed 15.2 to 18.2% more than the dry uncoated cylinders.

CATALYTIC ACTIVITY OF SUPPORTED COMPOSITION

The catalytic activity of the above-described alumina ceramic honeycomb coated with the composition $[Sr_{0.2}La_{0.8}][Co_{0.9}Ru_{0.1}]O_3$ and binder in the reduction of nitric oxide by carbon monoxide and in the oxidation of propane were determined substantially as described in Example 1. The light-off temperature and the temperatures of 25%, 50% and 90% conversion are given in Table I.

CATALYTIC ACTIVITY OF SUPPORTED COMPOSITION WITH AUTOMOTIVE EXHAUST GASES

The above-described coated alumina ceramic honeycomb cylinders had substantially the same catalytic activity as the catalyst of Example 2 in the reduction of nitrogen oxides and in the oxidation of carbon monoxide in automotive exhaust gases in a 1000-hour test substantially identical to that described in Example 2. Table II includes conversions of nitrogen oxides and of carbon monoxide obtained at 100-hour intervals during this test.

PREPARATION OF EXTRUDED CATALYST COMPOSITION

A thick paste containing 50 grams of the abovedescribed catalytic composition $[Sr_{0.2}La_{0.8}][Co_{0.9}Ru_{0.1}]O_3$, 42.5 grams of "Dispal" alumina dispersant and binder, 12.5 drops of commercial concentrated hydrochloric acid, and 62.5 milliliters of water was extruded under pressure through a hole nominally 0.125 inch in diameter. The extruded forms so obtained were dried at 120° C under reduced pressure, broken into segments about 0.25 inch long, and heated for 100 hours at about 900° C.

CATALYTIC ACTIVITY OF EXTRUDED CATALYST COMPOSITION

These extrusion products containing the catalytic composition $[Sr_{0.2}La_{0.8}][Co_{0.9}Ru_{0.1}]O_3$ and binder were placed in a catalyst chamber about 3.0 centimeters long and 1.5 centimeters in diameter and their catalytic activity in the reduction of nitric oxide with carbon monoxide, the oxidation of carbon monoxide, and the oxidation of propane was determined as described in Example 1 at an hourly gas space velocity of about 50,000 hr.$^{-1}$ before and after heating for an additional 220 hours at about 900° C. The light-off temperatures and the temperatures of 25%, 50% and 90% conversion are given in Table I.

TABLE II

Catalytic Activity with Automotive Exhaust Gases
Percent Conversion

| Hours Exposure | Example 2 Of CO with 1% Excess $O_2$ | Example 2 Of $NO_x$ with 1% Excess CO | Example 3 Of CC with 1% Excess $O_2$ | Example 3 Of $NO_x$ with 1% Excess CO | Example 10 |
|---|---|---|---|---|---|
| 0 | 93 | 99 | 99 | 97 | |
| 100 | 100 | 99 | 98 | 97 | |
| 200 | 100 | 99 | 98 | 99 | |
| 300 | 97 | 99 | 96 | 97 | |
| 400 | 93 | 99 | 96 | 96 | |
| 500 | 90 | 98 | 95 | 98 | |
| 600 | 92 | 96 | 89 | 98 | |
| 700 | 88 | 95 | 91 | 96 | |
| 800 | 86 | 95 | 88 | 96 | |
| 900 | 84 | 95 | 84 | 96 | |
| 1000 | 82 | 94 | 83 | 95 | |

EXAMPLE 4

Preparation of Catalytic Composition

A metal oxide having the nominal composition [$Sr_{0.2}La_{0.8}$] [$Co_{0.9}Ru_{0.1}$]$O_3$ was prepared by dissolving 50 grams of lanthanum nitrate ($La(NO_3)_3.6H_2O$), 6.11 grams of strontium nitrate ($Sr(NO_3)_2$), 38.0 grams of cobalt nitrate ($Co(NO_3)_2.6H_2O$), and 3.4 grams of ruthenium chloride ($RuCl_3.xH_2O$ containing about 41.5% ruthenium) in 500 milliliters of water, adding a solution of 57.7 grams of potassium carbonate ($K_2CO_3$) in 200 milliliters of water slowly and with vigorous stirring, separating the precipitated mixture of carbonates, drying at 120° C under reduced pressure, heating in a muffle furnace at 1000° C for 1 hour, grinding and mixing, and then heating at about 1000° C for 3 days with occasional grinding and mixing. The resulting catalytic composition was ground and passed through a 325-mesh sieve screen. The filtrate from the precipitated mixed carbonates contained an insignificant amount of ruthenium. The X-ray diffraction pattern of the catalytic composition (obtained with nickel-filtered CuK radiation) contained lines with the following Angstrom spacings and relative intensities: 3.86, 18%; 2.73, 100%; 2.23, 15%; 2.20, 6%; 1.92, 32%, 1.72, 26%; 1.36, 8%; 1.35, 7%.

APPLICATION OF CATALYTIC COMPOSITION TO A SUPPORT

Procedures similar to those of Example 1 were used to apply the above-described catalytic composition [$Sr_{0.2}La_{0.8}$] [$Co_{0.9}Ru_{0.1}$]$O_3$ to two cylinders of Torvex alumina ceramic honeycomb. The coated cylinders weighed 19.4% and 21.9% more than the dry uncoated cylinders.

CATALYTIC ACTIVITY OF SUPPORTED CATALYTIC COMPOSITION

The catalytic activity of the above-described alumina ceramic honeycombs coated with the composition [$Sr_{0.2}La_{0.8}$] [$Co_{0.9}Ru_{0.1}$]$O_3$ and binder was determined substantially as described in Example 1 to obtain the data given in Table I.

EXAMPLE 5

Preparation of Catalytic Composition on a Support

A support coated with a catalytic composition having the nominal formula [$Sr_{0.2}La_{0.8}$] [$Co_{0.9}Ru_{0.1}$]$O_3$ formed on the support was prepared by soaking a cylinder of "Torvex" alumina ceramic honeycomb like that described in Example 1 in a solution of 10.0 grams of lanthanum nitrate ($La(NO_3)_3.6H_2O$), 1.22 grams of strontium nitrate ($Sr(NO_3)_2$), 7.57 grams of cobalt nitrate ($CO(NO_3)_2.6H_2O$), and 0.735 grams of ruthenium chloride ($RuCl_3. xH_2O$, 39.71% Ru) in 100 milliliters of water, drying the cylinder at 120° C under reduced pressure, heating the cylinder for 30 minutes at 1000° C, soaking the cylinder again in the solution, drying the cylinder, and heating the cylinder overnight at 1000° C. The coated and heated cylinder weighed 3.4% more than the dry uncoated cylinder.

CATALYTIC ACTIVITY OF SUPPORTED CATALYTIC COMPOSITION

The catalytic activity of the above-described alumina ceramic honeycomb coated with the composition [$Sr_{0.2}La_{0.8}$] [$Co_{0.9}Ru_{0.1}$]$O_3$ was determined substantially as described in Example 1 to obtain the data given in Table I.

EXAMPLE 6

Preparation of Catalytic Composition

A metal oxide having the nominal composition [$Ba_{0.2}La_{0.8}$] [$Co_{0.9}Ru_{0.1}$]$O_3$ was prepared by dissolving 25 grams of lanthanum nitrate ($La(NO_3)_3.6H_2O$, 3.77 grams of barium nitrate ($Ba(NO_3)_2$), 19 grams cobalt nitrate ($Co(NO_3)_2.6H_2O$) and 1.79 grams of ruthenium chloride ($RuCl_3.2H_2O$, about 41.5% Ru) in 250 milliliters of water, adding slowly and with stirring a solution of 28.9 grams of potassium carbonate ($K_2CO_3$) in 100 milliliters of water, separating the precipitated mixture of carbonates, drying at 120° C under reduced pressure, heating in a muffle furnace at 1000° C for one hour, grinding and mixing, and heating at 1000° C for 4 days with occasional grinding and mixing. The resulting catalytic composition was ground and passed through a 325-mesh sieve screen.

APPLICATION OF CATALYTIC COMPOSITION TO A SUPPORT

Procedures similar to those of Example 1 were used to apply the above-described catalytic composition [$Ba_{0.2}La_{0.8}$] [$Co_{0.9}Ru_{0.1}$]$O_3$ to a cylinder to Torvex alumina ceramic honeycomb. The coated cylinder weighed 16.6% more than the dry uncoated cylinder.

CATALYTIC ACTIVITY OF SUPPORTED CATALYTIC COMPOSITION

The catalytic activity of the above-described alumina ceramic honeycomb coated with the composition [$Ba_{0.2}La_{0.8}$] [$Co_{0.9}Ru_{0.1}$]$O_3$ was determined substantially as described in Example 1 to obtain the data given in Table I.

EXAMPLE 7

Preparation of Catalytic Composition

A metal oxide having the nominal composition [$Sr_{0.2}RE_{0.8}$] [$Co_{0.9}Ru_{0.1}$]$O_3$ in which RE represents a mixture of rare earth metals in substantially the proportions in which they occur in monazite ore was prepared substantially by the procedure described in Example 6 from 30.0 grams of mixed rare earth nitrate (RE(-$NO_3)_3.5H_2O$) containing nominally about 48% Ce, 24% La, 17% Nd, 5% Pr, 3% Sm, 2% Gd, 0.2% Y, and 0.8% other rare earth metals by weight as the oxides), 3.74 grams of strontium nitrate ($Sr(NO_3)_2$), 23.1 grams of cobalt nitrate ($Co(NO_3)_2.6H_2O$, and 3.74 grams of ruthenium chloride ($RuCl_3.2H_2O$, about 41.5% Ru). The X-ray diffraction pattern of the black catalytic composition so obtained contained lines with the following Angstrom spacings and the indicated relative intensities: 3.87, 9% 2.72, 100%; 2.22, 10%, 1.92, 62%, 1.57, 22%; 1.56, 7%; 1.42, 7%; 1.35, 12%.

APPLICATION OF CATALYTIC COMPOSITION TO A SUPPORT

Procedures similar to those of Example 1 were used to apply the above-described catalytic composition [$Sr_{0.2}RE_{0.8}$] [$Co_{0.9}Ru_{0.1}$]$O_3$ to a cylinder of Torvex alumina ceramic honeycomb. The coated cylinder weighed 22.2% more than the dry uncoated cylinder.

CATALYTIC ACTIVITY OF SUPPORTED CATALYTIC COMPOSITION

The catalytic activity of the above-described alumina ceramic honeycomb coated with the composition [$Sr_{0.2}RE_{0.8}$] [$Co_{0.9}Ru_{0.1}$]$O_3$ and binder was determined substantially as described in Example 1 to obtain the data given in Table I.

EXAMPLE 8

PREPARATION OF CATALYTIC COMPOSITION

A metal oxide having the nominal composition [$Sr_{0.2}La_{0.8}$] [$Co_{0.98}Ru_{0.02}$]$O_3$ was made by substantially the procedures of Example 1 from 16.0 grams of lanthanum oxide ($La_2O_3$), 0.33 grams of ruthenium oxide ($RuO_2$), 3.62 grams of strontium carbonate ($Sr(CO_3)_2$), and 14.31 grams of cobalt carbonate ($CoCO_3$). The X-ray diffraction pattern of the resulting black catalytic composition was not significantly different from that of a metal oxide having the nominal composition $Sr_{0.2}La_{0.8}CoO_3$. The surface area of the ground composition determined by the Brunauer-Emmett-Teller method, was 1.0 square meter per gram.

APPLICATION OF CATALYTIC COMPOSITION TO A SUPPORT

The above-described composition [$Sr_{0.2}La_{0.8}$]-[$Co_{0.08}Ru_{0.02}$]$O_3$ was applied to a cylinder of Torvex alumina ceramic honeycomb substantially as described in Example 1, using a slurry containing 7.5 grams of the composition 2.0 grams of Dispal alumina dispersant and binder, and 3 drops of commercial concentrated hydrochloric acid in 17 milliliters of water. The dried and heated ceramic honeycomb cylinder weighed 24% more than the dried uncoated cylinder.

CATALYTIC ACTIVITY OF SUPPORTED CATALYTIC COMPOSITION

The catalytic activity of the above-described alumina ceramic honeycomb coated with the composition [$Sr_{0.2}La_{0.8}$] [$Co_{0.98}Ru_{0.02}$]$O_3$ and binder was determined substantially as described in Example 1 to obtain the data given in Table I.

EXAMPLE 9

Preparation of Catalytic Composition

A metal oxide having the nominal composition [$Sr_{0.2}La_{0.8}$] [$Co_{0.95}Ru_{0.05}$]$O_3$ was prepared substantially by the procedure of Example 6 using 400 grams of lanthanum nitrate ($La(NO_3)_3.6H_2O$), 49.0 grams of strontium nitrate ($Sr(NO_3)_2$), 320 grams of cobalt nitrate ($Co(NO_3)_2.6H_2O$), and 15.9 grams of ruthenium chloride ($RuCl_3.xH_2O$, 39.71% Ru) in 4 liters of water and 461 grams of potassium carbonate ($K_2CO_3$) in 1500 milliliters of water. The resulting black catalytic composition had an X-ray diffraction pattern similar to an oxide having the formula $SR_{0.2}La_{0.8}CoO_3$ containing a trace of lanthanum oxide ($La_2O_3$).

APPLICATION OF CATALYTIC COMPOSITION TO A SUPPORT

The above-described catalytic composition [$Sr_{0.2}La_{0.8}$] [$Co_{0.95}Ru_{0.05}$]$O_3$ was applied to cylinders of Torvex alumina ceramic honeycomb by procedures substantially like those described in Example 1 to obtain cylinders containing in one set (9A) 11.8% to 16.1% catalyst composition and binder and in another set (9B) 3.2% to 6.4% catalyst composition and binder.

CATALYTIC ACTIVITY OF SUPPORTED CATALYTIC COMPOSITION

The catalytic activity of the above-described alumina ceramic honeycombs coated with the composition [$Sr_{0.2}La_{0.8}$] [$Co_{0.95}Ru_{0.05}$]$O_3$ and binder at a loading of about 13% was determined substantially as described in Example 1 to obtain the data given in Table I.

EXAMPLE 10

Preparation of Catalytic Composition

A metal oxide of the composition [$K_{0.2}Sr_{0.2}La_{0.6}$]-[$Co_{0.8}Ru_{0.2}$]$O_3$ was prepared from a mixture of 2.97 grams of potassium carbonate, 3.17 grams of strontium carbonate, 10.51 grams of lanthanum oxide, 10.23 grams of cobalt carbonate and 5.0 grams of ruthenium oxide dihydrate (43.5% Ru) by heating for 4 days in a furnace at 1000° C following the procedure of Example 1. The catalyst composition so prepared was coated onto a cylinder of aluminum ceramic honeycomb sold under the trade name Torvex by the procedure of Example 1, the combined weight of catalyst and binder and support being 15.6% by weight greater than the uncoated support.

CATALYTIC ACTIVITY

The catalytic activity of the above composition in the reduction of nitric oxide and the oxidation of carbon monoxide and the oxidation of propane is given in Table I.

EXAMPLE 11

Preparation of Catalytic Composition

The composition $[Sr_{0.2}La_{0.8}][Co_{0.9}Pt_{0.1}]O_3$ was prepared by dissolving 35.2 grams of lanthanum nitrate $(LA(NO_3)_3 \cdot 5H_2O)$, 4.45 grams of strontium nitrate $(Sr(NO_3)_2)$, and 27.6 grams of cobalt nitrate $(Co(NO_3)_3 \cdot 6H_2O)$ in 500 milliliters of water, adding 40.3 grams of potassium carbonate in 200 milliliters of water and 2.43 grams of platinum dioxide $(PtO_2, 84.2\% \ Pt)$, separating the precipitated carbonates and added oxide, drying at 120° C under reduced pressure, and heating the dried mixture at 1000° C for 4 days with daily grinding and mixing. The resulting black catalytic composition was ground and passed through a 325-mesh sieve screen.

The X-ray diffraction of this catalytic composition showed it to be a nearly single-phase composition of the perovskite crystal type, with a few unidentified lines not attributable to platinum metal or to platinum dioxide and an indicated cell volume of 56.81 cubic Angstroms per formula unit. The size of the unit cell reflected and the introduction of the relatively large platinum ion into the crystal lattice of $[Sr_{0.2}La_{0.8}][Co]O_3$ (cell volume 56.13).

APPLICATION TO A SUPPORT

Procedures similar to those of Example 1 were used to apply the above catalytic composition to a cylinder of Torvex alumina ceramic honeycomb. The coated cylinder weighed 15.8% more than the dry uncoated cylinder.

CATALYTIC ACTIVITY OF SUPPORTED COMPOSITION

The catalytic activity of the above-described alumina honeycomb coated with the described composition and binder was determined substantially as described in Example 1 to obtain the data given in Table III.

TABLE III

CATALYTIC ACTIVITY OF $[Sr_{0.2}La_{0.8}][Co_{0.9}Pt_{0.1}]O_3$

| | Reduction of NO Hours at 900° C | | Oxidation of CO | | Oxidation of Propane | |
|---|---|---|---|---|---|---|
| | 0 | 100 | 0 | 100 | 0 | 100 |
| Light-off ° C | 300 | 390 | 210 | 215 | 250 | 285 |
| 25% Conversion ° C | 325 | 355 | 225 | 235 | 410 | 390 |
| 50% Conversion ° C | 350 | 370 | 245 | 250 | 500 | 475 |
| 90% Conversion ° C | 390 | 390 | 275 | 280 | — | — |

EXAMPLE 12

Preparation of Catalytic Compositions

Metal oxides having the nominal compositions

12A: $[Ba_{0.1}La_{0.9}][Al_{0.9}Pt_{0.1}]O_3$
12B: $[Sr_{0.2}La_{0.8}][Co_{0.9}Pd_{0.1}]O_3$ were prepared and coated onto cylinders of Torvex alumina ceramic honeycomb supports by substantially the procedures described in Example 1, using the ingredients, heating for the times and at the temperatures, and obtaining the amounts of the compositions on the ceramic honeycomb which are given in Table IV. The X-ray diffraction patterns of these metal oxides indicated 12A: a major component having an expanded LaAlO₃ perovskite lattice, not more than about 5% $La_2O_3$, and less than 0.2% platinum in the metallic state.

12B: a pattern essentially the same as that of $[Sr_{0.2}La_{0.8}][Co_{0.9}Pd_{0.1}]O_3$ (Example 13D) indicating the presence of less than about 0.2% each of $La_2O_3$, $Co_2O_3$, CoO, and no detectable palladium in the metallic state.

CATALYTIC ACTIVITY

The catalytic activity of these compositions in the reduction of nitric oxide by carbon monoxide, the oxidation of carbon monoxide, and the oxidation of propane, determined by the procedures described in Example 1 before and after heating the compositions on their supports for an additional 100 hours at about 900° C, are indicated by the data in Table V.

TABLE IV

Preparation of Compositions of Example 12

| | Grams of Ingredients Employed | |
|---|---|---|
| Example: | 12A | 12B |
| Ingredients | | |
| Barium oxide, BaO | 1.43 | — |
| Strontium carbonate, $SrCO_3$ | — | 16.42 |
| Lanthanum oxide, $La_2O_3$ | 13.33 | 72.72 |
| Aluminum oxide, $Al_2O_3$ | 4.18 | — |
| Cobalt carbonate, $CoCO_3$ | — | 59.66 |
| Platinum oxide, $PtO_2 \cdot xH_2O$, 83.37% Pt | 2.19 | — |
| Palladium oxide, $PdO \cdot xH_2O$, 74.18% Pd | — | 8.00 |
| Days heated in furnace | 4* | 4 |
| Furnace temperature, ° C | 900 | 900 |
| Percent composition and binder on support | 15.3 | 14.5 |

*Followed by 60 hours at 1,400° C before grinding and passing through a screen.

TABLE V

Catalytic Activity of Compositions of Example 12

| Composition: | 12A | 12B | 12B |
|---|---|---|---|
| Hours at 900° C: | 0 | 0 | 100 |
| Reduction of Nitric Oxide | | | |
| "Light-off" temp., ° C | 320 | 280 | 360 |
| 25% conversion, ° C | 370 | 310 | 395 |
| 50% conversion, ° C | 425 | 465 | 430 |
| 90% conversion, ° C | 510 | 540 | 485 |
| Oxidation of Carbon Monoxide | | | |
| "Light-off" temp., ° C | 305 | 290 | 230 |
| 25% conversion, ° C | 320 | 320 | 235 |
| 50% conversion, ° C | 340 | 350 | 260 |
| 90% conversion, ° C | 370 | 400 | 290 |
| Oxidation of Propane | | | |
| "Light-off" temp., ° C | 420 | 385 | 335 |
| 25% conversion, ° C | 490 | 505 | 425 |
| 50% conversion, ° C | 550 | — | 515 |
| 90% conversion, ° C | — | — | — |

EXAMPLE 13

Preparation of Catalytic Compositions

Metal oxides having the nominal compositions

13A: $[Sr_{0.06}La_{0.94}][Al_{0.80}Co_{0.16}Ru_{0.04}]O_3$
13B: $[Sr_{0.01}La_{0.9}Ru_{0.1}]O_3$
13C: $[Sr_{0.3}La_{0.7}][Fe_{0.9}Ru_{0.1}]O_3$

13D $[Sr_{0.2}La_{0.8}]$ $[Co_{0.9}Rh_{0.1}]O_3$ were prepared and coated onto cylinders of Torvex alumina ceramic honeycomb supports by substantially the procedures described in Example 3, using the ingredients, heating for times and at the temperatures, and obtaining the amounts of the compositions on the ceramic honeycomb which are given in Table VI. The X-ray diffraction patterns of these metal oxides indicated 13A: a distorted perovskite crystal structure like $LaAlO_3$, with no suggestion of the presence of the cobalt spinel $CoAl_2O_4$.

13B: a single phase having a structure of the perovskite type similar to that of $LaAlO_3$. Crystal cell dimensions calculated from some of the lines indicated a cell volume of 55.10 cubic Angstroms per formula unit. A solid solution of 90% $LaAlO_3$ (unit cell volume 54.46 cubic Angstroms) and 10% $SrRuO_3$ (unit cell volume 60.45 cubic Angstroms) is calculated to have a unit cell volume of 55.05 cubic Angstroms.

13C: an expanded $LaFeO_3$-type perovskite crystal structure with no evidence of binary metal oxides.

13D: A $LaCoO_3$-type crystal structure with an expanded lattice and an X-ray pattern substantially identical to that of the perovskite $[Sr_{0.2}La_{0.8}]$ $[Co_{0.9}Ru_{0.1}]O_3$ (Example 2).

CATALYTIC ACTIVITY

The catalytic activity of these compositions in the reduction of nitric oxide by carbon monoxide, the oxidation of carbon monoxide, and the oxidation of propane, determined by the procedures described in Example 1 before and after heating the compositions on the supports for an additional 100 hours at about 900° C, are indicated by the data in Table VII.

TABLE VI

Preparation of Compositions of Example 13

| Example: | Grams of Ingredients Employed | | | |
|---|---|---|---|---|
| | 13A | 13B | 13C | 13D |
| Ingredients | | | | |
| Strontium nitrate, $SrCO_3$ | 6.24 | 4.15 | 25.0 | 40.75 |
| Lanthanum nitrate, $La(NO_3)_3 \cdot 6H_2O$ | — | — | — | 51.88 |
| Lanthanum nitrate, $La(NO_3)_3 \cdot 6H_2O$ | 200 | 76.2 | 119 | — |
| Aluminum nitrate, $Al(NO_3)_3 \cdot 6H_2O$ | 147.4 | — | — | — |
| Aluminum nitrate, $Al(NO_3)_3 \cdot 9H_2O$ | — | 66.0 | — | — |
| Cobalt nitrate, $Co(NO_3)_3 \cdot 6H_2O$ | 29.9 | — | — | 40.75 |
| Ferric nitrate, $Fe(NO_2)_3 \cdot 9H_2O$ | — | — | 143 | — |

TABLE VI-continued

Preparation of Compositions of Example 13

| Example: | Grams of Ingredients Employed | | | |
|---|---|---|---|---|
| | 13A | 13B | 13C | 13D |
| Ruthenium chloride, $RuCl_3 \cdot xH_2O$, 39.71% Ru | 5.02 | 5.0 | 10.0 | — |
| Rhodium chloride, $RhCl_3 \cdot xH_2O$, 40% Rh | — | — | — | 4.00 |
| Potassium carbonate, $K_2CO_3$ | 234.96 | 95.6 | 165.9 | 63.3 |
| Days heated in furnace | 4 | 4 | 4 | 4 |
| Furnace Temperature, ° C | 1000 | 950 | 950 | 950 |
| Percent composition and binder on support | 15.4 | 16.2 | 16.7 | 21.1 |

TABLE VIII

Catalytic Activity of Compositions of Example 13

| Composition: | 13A | | 13B | | 13C | | 13D | |
|---|---|---|---|---|---|---|---|---|
| Hours at 900° C: | 0 | 100 | 0 | 100 | 0 | 100 | 0 | 100 |
| Reduction of Nitric Oxide | | | | | | | | |
| "Light-off" temp., ° C | 265 | 290 | 200 | 290 | 310 | 305 | 200 | 300 |
| 25% conversion, ° C | 300 | 330 | 250 | 325 | 330 | 330 | 225 | 355 |
| 50% conversion, ° C | 335 | 370 | 305 | 355 | 355 | 360 | 250 | 380 |
| 90% conversion, ° C | 385 | 435 | 380 | 410 | 390 | 405 | 295 | 435 |
| Oxidation of Carbon Monoxide | | | | | | | | |
| "Light-off" temp., ° C | 195 | 270 | 245 | 220 | 290 | 265 | 250 | 210 |
| 25% conversion, ° C | 245 | 300 | 265 | 300 | 310 | 295 | 270 | 225 |
| 50% conversion, ° C | 275 | 325 | 285 | 325 | 325 | 325 | 290 | 240 |
| 90% conversion, ° C | 325 | 375 | 315 | 355 | 355 | 370 | 325 | 295 |
| Oxidation of Propane | | | | | | | | |
| "Light-off" temp., ° C | 305 | 405 | 310 | 340 | 325 | 315 | 225 | 310 |
| 25% conversion, ° C | 380 | 480 | 340 | 430 | 405 | 405 | 395 | 390 |
| 50% conversion, ° C | 410 | 555 | 355 | 510 | 460 | 480 | 490 | 445 |
| 90% conversion, ° C | 510 | — | 455 | — | — | — | — | — |

EXAMPLE 14

Preparation of Catalytic Compositions

Metal oxides having the nominal compositions

14A: $[Sr_{0.1}La_{0.9}]$ $[Ni_{0.9}Pt_{0.1}]O_3$
14B: $[Ba_{0.4}La_{0.6}][Co_{0.9}Pt_{0.1}]O_3$
14C: $[Sr_{0.4}La_{0.6}]$ $[Co_{0.9}Pt_{0.1}]O_3$ were prepared and coated onto cylinders of Torvex alumina ceramic honeycomb supports by substantially the procedures described in Example 11, using the ingredients, heating for the times and at the temperatures, and obtaining the amounts of the compositions on the ceramic honeycomb which are given in Table VIII. The X-ray diffraction patterns of these metal oxides indicated 14A: a $LaNiO_3$ perovskite lattice containing $NiAl_2O_4$ and less than about 0.2% of NiO and platinum metal.

14B: a lattice-expanded $LaCoO_3$ perovskite structure with no evidence of binary oxides or metallic platinum.

14C: a perovskite crystal structure similar to that of $LaCoO_3$ but with displacement to larger d-spacings and less than about 0.2% of platinum metal.

CATALYTIC ACTIVITY

The catalytic activity of these compositions in the reduction of nitric oxide by carbon monoxide, the oxidation of carbon monoxide, and the oxidation of propane, determined by the procedures described in Example 1 before and after heating the compositions on their supports for an additional 100 hours at about 400° C, are indicated by the data in Table IX.

TABLE VIII

Preparation of Compositions of Example 14

| Example: | Grams of Ingredients Employed | | |
|---|---|---|---|
| | 14A | 14B | 14C |
| Ingredients | | | |
| Barium nitrate, $Ba(NO_3)_2$ | — | 126 | — |
| Strontium nitrate, $Sr(NO_3)_2$ | 10.9 | — | 98.4 |
| Lanthanum nitrate, $La(NO_3)_3 \cdot 5H_2O$ | 200 | — | 301 |
| Lanthanum nitrate, $La(NO_3)_3 \cdot 6H_2O$ | — | 300 | — |
| Cobalt nitrate, $Co(NO_3)_2 \cdot H_2O$ | — | 317.2 | 303 |
| Nickel nitrate, $Ni(NO_3)_2 \cdot 6H_2O$ | 134.2 | — | — |
| Potassium carbonate, $K_2CO_3$ | 200.1 | 441 | 422 |
| Platinum oxide, $PtO \cdot xH_2O$, 81.9% Pt | 12.34 | — | 27.9 |
| Platinum oxide, $PtO \cdot xH_2O$, 83.37% Pt | — | 28.3 | — |
| Days heated in furnace | 4 | 4 | 4 |
| Furnace temperature, °C | 950 | 900 | 950 |
| Percent composition and binder on support | 22.4 | 14.4 | 15.1 |

TABLE IX

Catalytic Activity of Compositions of Example 14

| Composition: | 14A | | 14B | | 14C | |
|---|---|---|---|---|---|---|
| Hours at 900° C: | 0 | 100 | 0 | 100 | 0 | 100 |
| Reduction of Nitric Oxide | | | | | | |
| "Light-off" temp., °C | 365 | 300 | 295 | 305 | 305 | 295 |
| 25% conversion, °C | 400 | 335 | 320 | 330 | 325 | 335 |
| 50% conversion, °C | 435 | 370 | 345 | 355 | 350 | 370 |
| 90% conversion, °C | 490 | 465 | 385 | 390 | 390 | 465 |
| Oxidation of Carbon Monoxide | | | | | | |
| "Light-off" temp., °C | 330 | 265 | 195 | 190 | 200 | 205 |
| 25% conversion, °C | 355 | 280 | 260 | 200 | 285 | 235 |
| 50% conversion, °C | 380 | 290 | 275 | 215 | 305 | 260 |
| 90% conversion, °C | 420 | 315 | 300 | 240 | 345 | 305 |
| Oxidation of Propane | | | | | | |
| "Light-off" temp., °C | 375 | 355 | 475 | 275 | 380 | 300 |
| 25% conversion, °C | 465 | 440 | 535 | 320 | 445 | 350 |
| 50% conversion, °C | 485 | 470 | 570 | 370 | 510 | 395 |
| 90% conversion, °C | — | — | — | — | 445 | — |

EXAMPLE 15

Preparation of Catalytic Compositions

Metal oxides having the nominal compositions

15A: $[Ca_{0.5}Ba_{0.5}][Ti_{0.9}Pt_{0.1}]O_3$
15B: $[Sr_{0.2}La_{0.8}][Co_{0.9}Ru_{0.1}]O_3$
15C: $[Ba_{0.9}La_{0.1}][Al_{0.9}Pt_{0.1}]O_3$
15D: $[Rb_{0.2}Bi_{0.8}][Ti_{0.9}Ru_{0.1}]O_3$ were prepared and coated onto cylinders of Torvex alumina ceramic honeycomb supports by substantially the procedures described in Example 1, using the ingredients, heating for the times and at the temperatures, and obtaining the amounts of the compositions on the ceramic honeycomb which are given in Table X. The X-ray diffraction patterns of these metal oxides indicated:

15A: a pattern similar to that of the perovskite $BaTiO_3$ with shorter d-spacings and traces (less than 0.2%) of the perovsite $CaTiO_3$ and of platinum in the metallic state.

15B: an unidentified pattern, with no evidence of binary metal oxides.

15C: an expanded $LaAlO_3$ perovskite lattice containing not more than 5% $La_2O_3$, and traces (less than 0.2%) of platinum in the metallic state.

15D: a pattern similar to that of $Bi_4(TiO_4)_3$, with no evidence of binary metal oxides.

CATALYTIC ACTIVITY

The catalytic activity of these compositions in the reduction of nitric oxide by carbon monoxide, the oxidation of carbon monoxide, the oxidation of propane, determined by the procedures described in Example 1 before and after heating the compositions on their supports for an additional 100 hours at about 900° C, are indicated by the data in Table XI.

TABLE X

Preparation of Compositions of Example 15

| Composition: | Grams of Ingredients Employed | | | |
|---|---|---|---|---|
| | 15A | 15B | 15C | 15D |
| Ingredients | | | | |
| Rubidium oxide, $Rb_2CO_3$ | — | — | — | 2.3 |
| Calcium oxide, CaO | 3.66 | — | — | — |
| Strontium carbonate, $SrCO_3$ | — | 5.25 | — | — |
| Barium oxide, BaO | 10.0 | — | 1.43 | — |
| Lanthanum oxide, $La_2O_3$ | — | 25.10 | 13.33 | — |
| Bismuth oxide, $Bi_2O_3$ | — | — | — | 20.0 |
| Titanium dioxide, $TiO_2$ | 9.38 | — | — | 7.20 |
| Chromium trioxide, $Cr_2O_3$ | — | — | — | — |
| Niobium pentoxide, $Nb_2O_5$ | — | 12.10 | — | — |
| Aluminum oxide, $Al_2O_3$ | — | — | 4.18 | — |
| Ruthenium oxide, $RuO_2$ (59.8% Ru) | — | 3.00 | — | 1.69 |
| Platinum oxide, $PtO_2$ (84.23%)Pt) | 3.53 | — | 2.16 | — |
| Days heated in furnace | 3* | 4 | 4 | 4 |
| Furnace temperature, °C | 900 | 900 | 900 | 1000 |
| Percent composition and binder | | | | |

TABLE X-continued

Preparation of Compositions of Example 15

| Composition: | Grams of Ingredients Employed | | | |
|---|---|---|---|---|
| | 15A | 15B | 15C | 15D |
| on support | 19.3 | 13.7 | 15.3 | 24.0 |

*Followed by 60 hours at 1400° C before grinding and passing through a screen sieve.

TABLE XI

Catalytic Activity of Compositions of Example 15

| Composition: | 15A | 15B | | 15C | | | 15D | |
|---|---|---|---|---|---|---|---|---|
| Hours at 900° C: | 0 | 0 | 100 | 0 | 100 | 200 | 0 | 100 |
| Reduction of Nitric Oxide | | | | | | | | |
| "Light-off" temp., ° C | 265 | 305 | 385 | 360 | 330 | 305 | 315 | 2 260 |
| 25% conversion, ° C | 400 | 325 | 415 | 410 | 400 | 375 | 370 | 330 |
| 50% conversion, ° C | 510 | 350 | 445 | 440 | 490 | 425 | 540 | 390 |
| 90% conversion, ° C | 595 | 385 | 490 | 485 | 580 | 485 | — | — |
| Oxidation of Carbon Monoxide | | | | | | | | |
| "Light-off" temp., ° C | 300 | 275 | 240 | 245 | 225 | 290 | 295 | 275 |
| 25% conversion, ° C | 320 | 305 | 320 | 260 | 240 | 305 | 405 | 385 |
| 50% conversion, ° C | 335 | 335 | 390 | 275 | 255 | 335 | 510 | 570 |
| 90% conversion, ° C | 365 | 445 | 590 | 335 | 285 | 365 | — | — |
| Oxidation of Propane | | | | | | | | |
| "LIght-off" temp., ° C | 390 | 200 | — | 425 | 390 | 455 | — | 495 |
| 25% conversion, ° C | 515 | 470 | — | 495 | 515 | 470 | — | — |
| 50% conversion, ° C | 595 | 515 | — | 530 | 570 | 570 | — | — |
| 90% conversion, ° C | — | — | — | — | — | — | — | — |

I claim:

1. A compound having the perovskite-type $ABO_3$ crystal structure wherein
   1. the sites of Type A are occupied by cations of at least two different metals each occupying at least 1% of the Type A cation sites and having an ionic radius between 0.8 and 1.65 Å; and
   2. from about 1% up to about 20% of the sites of Type B are occupied by ions of platinum group metals and the remaining sites of Type B are occupied by ions of nonplatinum group metals having ionic radii between about 0.4 and 1.4 Å.

2. A compound of claim 1 wherein at least about 50% of the remaining sites of Type B are occupied by nonplatinum metal group ions of variable valence.

3. A compound of claim 2 wherein said metal ions of variable valence have atomic number of from 22 to 29 inclusive.

4. A compound of claim 3 wherein said metal ions of variable valence are iron, nickel or cobalt ions.

5. A compound of claim 1 wherein said metal ions occupying sites of Type A are selected from ions of potassium, strontium, barium, lanthanum or metals of atomic number 58 to 71, inclusive.

6. A compound of claim 1 wherein said ions of platinum metals are ions of ruthenium or platinum groups.

7. A compound of claim 2 wherein at least 5% of the said remaining sites of Type B are occupied by metal ions of a variable valence in a first valence and at least a further 5% of the said remaining sites of Type B are occupied by ions of the same metal of variable valence in a second valence state.

8. A compound of claim 2 wherein all of the remaining sites of Type B are occupied by nonplatinum group metal ions of variable valence 9. A compound of claim 1 wherein at least about 50% of the said remaining sites of Type B are occupied by ions of nonplatinum group metals having a single fixed valence.

10. A compound of claim 9 wherein said metal is a metal of Group IIIa of the Periodic Table.

11. A compound of claim 10 wherein said metal is aluminum.

12. A catalyst comprising a compound of claim 1 on a shaped support.

* * * * *